United States Patent [19]
Koizumi et al.

[11] Patent Number: 5,586,323
[45] Date of Patent: Dec. 17, 1996

[54] COMPILER SYSTEM USING AN INTERMEDIATE ABSTRACT FORM AND MACHINE-SPECIFIC INSTALLERS

[75] Inventors: Shinobu Koizumi, Sagamihara; Ichiro Kyushima; Tan Watanabe, both of Yokohama; Toshiaki Kohno, Machida; Singi Domen, Fujisawa, all of Japan

[73] Assignee: Hitachi, Ltd., Tokyo, Japan

[21] Appl. No.: 872,773

[22] Filed: Apr. 23, 1992

[30] Foreign Application Priority Data

Apr. 23, 1991 [JP] Japan .................................. 3-091980

[51] Int. Cl.⁶ ............................................. G06F 9/44
[52] U.S. Cl. ................................................... 395/705
[58] Field of Search ........................................... 395/700

[56] References Cited

U.S. PATENT DOCUMENTS

| 4,667,290 | 5/1987 | Goss et al. .......................... | 364/300 |
| 5,187,789 | 2/1993 | O'Hair ................................ | 395/700 |
| 5,280,613 | 1/1994 | Chan et al. .......................... | 395/700 |

FOREIGN PATENT DOCUMENTS

| 0278472 | 8/1988 | European Pat. Off. . |
| 0464526A2 | 1/1992 | European Pat. Off. . |
| 0476667A2 | 3/1992 | European Pat. Off. . |

OTHER PUBLICATIONS

*IBM Technical Disclosure Bulletin*, "Centralized Code Generation Services", J. K. Allsen, et al., vol. 21, No. 7, Dec. 1978.

*IBM Technical Disclosure Bulletin*, "Effective Register Management During Code Generation", K. M. Gilbert, vol. 15, No. 8, Jan. 1973.

*Primary Examiner*—Kevin A. Kriess
*Attorney, Agent, or Firm*—Antonelli, Terry, Stout & Kraus

[57] ABSTRACT

A translator system for translating source programs into machine language programs in an electronic computer system. An object program common to a plurality of different machine types of computers are generated while implementing execution performance equivalent to object programs inherent to the computers. A compiler translates a source program into an abstract object program including an abstract machine instruction sequence and indication concerning allocation of abstract registers. An installer converts the abstract object program into a machine language program of target computer on the basis of executable computer specification information including register usage indication and machine instruction selecting rules.

22 Claims, 44 Drawing Sheets

FIG. 4

```
3120 ── CONDITIONAL STATEMENT
          if CONDITIONAL EQUATION STATEMENT
          if CONDITIONAL EQUATION STATEMENT else STATEMENT
3122 ── ASSIGN STATEMENT
          VARIABLE NAME = EXPRESSION ;
3124 ── FUNCTION REFERENCE
          FUNCTION NAME (PARAMETER,
               PARAMETER,···PARAMETER) ;
          alloc (ABSTRACT REGISTER NAME, REGISTER TYPE,
               DISCRIMINANT VARIABLE, INSTRUCTION NUMBER,
               PRESERVE NUMBER, PRIORITY) ;
          free (ABSTRACT REGISTER NAME) ;
          bblock (BASIC BLOCK NUMBER, PRECEDING BLOCK,
               SUCCEEDING BLOCK)
```

FIG. 5A

INSTRUCTION FORMAT OF EACH ArmCode

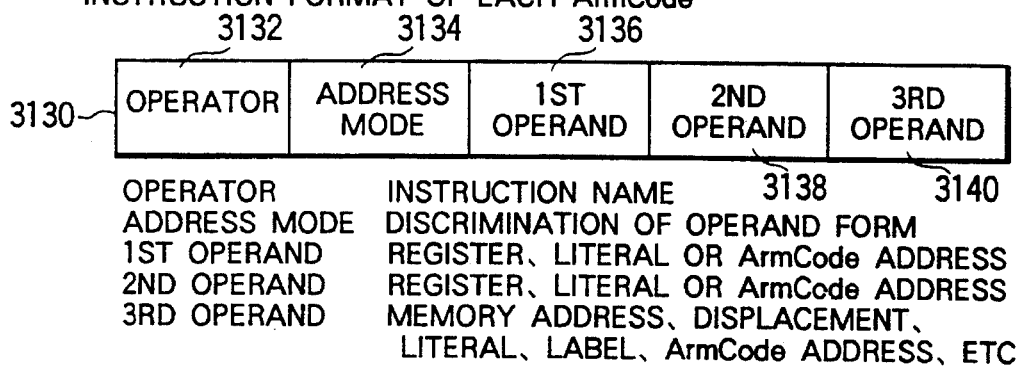

| OPERATOR | INSTRUCTION NAME |
| --- | --- |
| ADDRESS MODE | DISCRIMINATION OF OPERAND FORM |
| 1ST OPERAND | REGISTER, LITERAL OR ArmCode ADDRESS |
| 2ND OPERAND | REGISTER, LITERAL OR ArmCode ADDRESS |
| 3RD OPERAND | MEMORY ADDRESS, DISPLACEMENT, LITERAL, LABEL, ArmCode ADDRESS, ETC |

FIG. 5B

OBJECT REPRESENTED BY OPERANDS

| | | |
| --- | --- | --- |
| 3150 | REGISTER | ABSTRACT REGISTER NUMBER |
| 3152 | MEMORY ADDRESS | ABSOLUTE ADDRESS OR POSITION OF SYMBOL TABLE RERESENTING VARIABLE NAME OR LOGICAL REGISTER NUMBER REPRESENTING INTRA-MEMORY CONSTANT |
| 3154 | DISPLACEMENT | NUMERICAL VALUE REPRESENTING DISPLACEMENT RELATIVE TO BASE REGISTER |
| 3158 | LITERAL | INTEGER CONSTANT (NUMERICAL VALUES, CHARACTER CODES OR POSITIONS OF CHARACTER STRING TABLE AND COMMENT TABLE AS OBJECT FOR OPERATION) |
| 3160 | LABEL | LABEL TABLE NUMBER |
| 3162 | ArmCode ADDRESS | POSITION OF ONE INSTRUCTION OF ArmCode |

FIG. 6

| | ADDRESS MODE | OPERAND 1 | OPERAND 2 | OPERAND 3 |
|---|---|---|---|---|
| RegReg | REGISTER · REGISTER | REGISTER R1 | REGISTER R2 | |
| RegM1 | REGISTER · MEMORY INDIRECT | REGISTER R1 | ADDRESS REGISTER R2 | |
| RegMR | REGISTER · MEMORY RELATIVE | REGISTER R1 | BASE REGISTER R2 | DISPLACEMENT d |
| RegMD | REGISTER · MEMORY DIRECT | REGISTER R1 | | MEMORY ADDRESS m |
| RegAdr | REGISTER · MEMORY ADDRESS | REGISTER R1 | BASE REGISTER R2 | DISPLACEMENT d |
| RegCon | REGISTER · CONSTANT | REGISTER R1 | | CONSTANT c3 |
| RegRc | REGISTER · REGISTER · CONSTANT | REGISTER R1 | REGISTER R2 | CONSTANT c3 |
| RegCC | REGISTER · REGISTER · CONSTANT | REGISTER R1 | CONSTANT c2 | CONSTANT c3 |
| RegRCC | REGISTER · REGISTER · CONSTANT | REGISTER R1 | REGISTER R2 | CONSTANT c3*256+CONSTANT c4 |
| Const | CONSTANT | | | CONSTAN c3 |
| RegR | REGISTER INDIRECT | | BASE REGISTER R2 | DISPLACEMENT d |
| Reg1 | 1 REGISTER | REGISTER R1 | | |
| Reg0 | 0 OPERAND | | | |
| Cont0 | PSUED 0 INSTRUCTION FOR CONTROL | | | |
| Cont1 | PSUED 1 INSTRUCTION FOR CONTROL | CONSTANT c1 | CONSTAN c2 | CONSTANT c3 |
| Cont2 | PSUED 2 INSTRUCTION FOR CONTROL | ArmCode ADDRESS | | CONSTANT c3/ArmCode ADDRESS |
| Cont3 | PSUED 3 INSTRUCTION FOR CONTROL | | | ArmCode ADDRESS |

FIG. 7

LOAD INSTRUCTIONS 3210

Load        LOAD ONE WORD DESIGNATED BY OPERAND 2 3 IN OPERAND 1
    LoadB      LOAD ONE BYTE DESIGNATED BY OPERAND 2 3 IN OPERAND 1

MODE-WISE PROCESSING

RegReg    R1 ← [R2]
    RegM1     R1 ← [R2^]
    RegMR    R1 ← [([R2]+d)^]
    RegMD    R1 ← [d]
    RegCon    R1 ← c3
    RegAdr    R1 ← [R2]+d

---

STORE INSTRUCTIONS 3220

Store       STORE ONE WORD OF OPERAND 1 AT LOCATION DESIGNATED BY OPERAND 2, 3
    StoreB     STORE ONE BYTE OF OPERAND 1 AT LOCATION DESIGNATED BY OPERAND 2 3

MODE-WISE PROCESSING

RegReg    R1 → R2
    RegM1     R1 → R2^
    RegMR    R1 → ([R2]+d)^
    RegMD    R1 → d

---

INTEGER-CLASS BINARY FLOATING-POINT OPERATION INSTRUCTIONS 3230

Add        ADD OPERAND 2 TO OPERAND 1
    Sub        SUBTRACT OPERAND 2 FROM OPERAND
    Mult       MULTIPLY OPERAND 1 BY OPERAND 2
    Div        DIVIDE OPERAND 1 BY OPERAND 2
    UnsAdd    SAME AS ADD EXCEPT UNSIGNED COMPUTATION
    UnsSub    SAME AS SUB EXCEPT UNSIGNED COMPUTATION
    AddC      SAME AS ADD EXCEPT INVOLVEMENT OF CARRY
    SubB      SAME AS SUB EXCEPT INVOLVEMENT OF CARRY

MODE-WISE PROCESSING INSTRUCTIONS

RegReg    [([R1] op [R2]) → R1    op : OPERATOR
    RegCon    [([R1] op c3) → R1

FIG. 8

| REAL NUMBER-CLASS BINARY FROATING-POINT OPERATION INSTRUCTIONS 3240 | |
|---|---|
| AddR | ADD OPERAND 2 TO OPERAND 1 |
| SubR | SUBTRACT OPERAND 2 FROM OPERAND 1 |
| MultR | MULTIPLY OPERAND 1 WITH OPERAND 2 |
| DivR | DIVIDE OPERAND 1 BY OPERAND 2 |
| MODE-WISE PROCESSING | |
| RegReg | ([R1] op [R2]) → R1    op : OPERATOR |
| RegCon | ([R1] op c3) → R1 |

| BINARY LOGICAL OPERATION INSTRUCTIONS 3250 | |
|---|---|
| And | ANDING OF OPERAND 1 WITH OPERAND 2 |
| Or | ORING OF OPERAND 1 WITH OPERAND 2 |
| Xor | XORING OF OPERAND 1 WITH OPERAND 2 |
| MODE-WISE PROCESSING | |
| RegReg | ([R1] op [R2]) → R1    op : OPERATOR |
| RegCon | ([R1] op c3) → R1 |

| UNITARY OPERATION INSTRUCTIONS 3260 | |
|---|---|
| Negate | SIGN INVERSION OF OPERAND 1 |
| Not | BIT INVERSION OF OPERAND 1 |
| MODE-WISE PROCESSING | |
| Reg1 | OPERATION ON CONTENT OF OPERAND 1 WITH RESULT LEFT IN OPERAND 1 |

| COMPARISON INSTRUCTION 3270 | |
|---|---|
| Comp | COMPARISON OF OPERAND 1 WITH 2 TO SET CONDITION CODE |
| MODE-WISE PROCESSING | |
| RegReg | IF [R1]>[R2] THEN Gt, IF [R1]=[R2] THEN Eq, IF [R1]<[R2] THEN Lt |
| RegCon | IF [R1]>c3 THEN Gt, IF [R1]=c3 THEN Eq, IF [R1]<c3 THEN Lt |

| CONDITION TEST INSTRUCTIONS 3280 | |
|---|---|
| TZero MODE Reg1 | IF "0" THEN SET CONDITION CODE TO Eq |
| TBit MODE ReGCon | IF BIT INDICATED BY 3RD OPERAND OF [R1] IS "0" THEN Eq |

FIG. 9

| CONDITIONAL BRANCH INSTRUCTIONS 3290 | |
|---|---|
| BrEq | JUMP TO POSITION DESIGNATED BY OPERAND IF CONDITION CODE IS Eq |
| BrNe | JUMP TO POSITION DESIGNATED BY OPERAND UNLESS CONDITION CODE IS Eq |
| BrGt | JUMP TO POSITION DESIGNATED BY OPERAND IF CONDITION CODE IS Gt |
| BrGe | JUMP TO POSITION DESIGNATED BY OPERAND IF CONDITION CODE IS Gt OR Eq |
| BrLe | JUMP TO POSITION DESIGNATED BY OPERAND IF CONDITION CODE IS Lt OR Eq |
| BrLt | JUMP TO POSITION DESIGNATED BY OPERAND IF CONDITION CODE IS Lt |
| | IF ANY CASE, IMMEDIATELY SUCCEEDING INSTRUCTION IS EXECUTED UNLESS CONDITION IS MET |
| MODE-WISE PROCESSING | |
| Const | POSITION DESIGNATED BY LABEL TABLE LBL [C3] IS JUMP DESTINATION INSTRUCTION ADDRESS |
| RegR | [R2]+d IS JUMP DESTINATION INSTRUCTION ADDRESS |
| UNCONDITIONAL BRANCH INSTRUCTIONS 3300 | |
| Jump | JUMP TO POSITION DESIGNATED BY OPERAND |
| MODE-WISE PROCESSING | |
| Const | POSITION DESIGNATED BY LABEL TABLE LBL [C3] IS JUMP DESTINATION INSTRUCTION ADDRESS |
| RegR | [R2]+d IS JUMP DESTINATION INSTRUCTION ADDRESS |
| SUBPROGRAM REFERENCE INSTRUCTIONS 3310 | |
| Call | AFTER RECORDING RETURN ADDRESS, JUMP TO POSITION DESIGNATED BY OPERAND |
| MODE-WISE PROCESSING | |
| RegMR | PLACE RETURN ADDRESS IN R1 AND JUMP TO ADDRESS [R2]+d |
| RegMD | PLACE RETURN ADDRESS IN R1 AND JUMP TO ADDRESS DESIGNATED BY LBL [C3] |
| Reg1 | AFTER STACKING RETURN ADDRESS, JUMP TO ADDRESS [R1] |
| RETURN INSTRUCTIONS 3320 | |
| Return | JUMP TO RETURN ADDRESS RECORDED UPON CALL |
| MODE-WISE PROCESSING | |
| Reg1 | JUMP TO RETURN ADDRESS RECORDED AT R1 |
| Reg0 | FETCH RETURN ADDRESS STACKED UPON CALL AND JUMP TO IT |

FIG. 10

| SHIFT INSTRUCTIONS 3330 | |
|---|---|
| SHIFT CONTENT OF 1ST OPERAND R1 TO LEFT OR RIGHT BY NUMBER $\underline{n}$ INDICATED BY 2ND OR 3RD OPERAND | |
| ShiftL | SHIFT R1 TO LEFT BY $\underline{n}$ BITS WITH RIGHTMOST $\underline{n}$ BITS BEING "0" |
| ShiftR | SHIFT R1 TO RIGHT BY $\underline{n}$ BITS WITH LEFTMOST $\underline{n}$ BITS BEING "0" |
| MODE-WISE PROCESSING | |
| RegCon | R1 REPRESENTS TARGET REGISTER WITH c3 BEING BIT NUMBER FOR SHIFT |
| RegReg | R1 REPRESENTS TARGET REGISTER WITH [R2] BEING BIT NUMBER FOR SHIFT |

| ROTATION INSTRUCTIONS 3340 | |
|---|---|
| ROTATE CONTENT OF 1ST OPERAND R1 TO LEFT OR RIGHT BY A NUMBER $\underline{n}$ INDICATED BY 2ND OR 3RD OPERAND | |
| RotL | ROTATE R1 TO LEFT BY $\underline{n}$ BITS |
| RotR | ROTATE R1 TO RIGHT BY $\underline{n}$ BITS |
| MODE-WISE PROCESSING | |
| RegCon | R1 REPRESENTS TARGET REGISTER WITH c3 BEING BIT NUMBER FOR THE ROTATION |
| RegReg | R1 REPRESENTS TARGET REGISTER WITH [R2] BEING BIT NUMBER FOR ROTATION |

| BIT MANIPULATION INSTRUCTIONS 3350 | | |
|---|---|---|
| GetBit | RegCC | PLACE c3-BIT DATA STARTING FROM BIT c2 OF R1 IN R1 WITH RIGHT JUSTIFICATION. LEFT PART OR R1 IS "0" |
| GetBit | RegRCC | PLACE c3-BIT DATA STARTING FROM BIT c2 OF R2 IN R1 WITH RIGHT JUSTIFICATION. LEFT PART OR R1 IS "0" |
| PutBit | RegRCC | PLACE RIGHTMOST c4-BIT LENGTH DATA OF R1 IN A c4-BIT LENGTH FIELD STARTING FROM BIT c3 OF R2. CONTENTS OF OTHER BIT FIELD ARE UNCHANGED |

| DATA CONVERSION INSTRUCTIONS 3360 | | |
|---|---|---|
| I to R | RegReg | INTEGER-TO-REAL CONVERSION OF CONTENT OF R1 AND PLACING THE RESULT IN R2 |
| R to I | RegReg | REAL-TO-INTEGER CONVERSION OF CONTENT OF R1 AND PLACING THE RESULT IN R2 |
| I to D | RegReg | INTEGER-TO-DOUBLE REAL CONVERSION OF CONTENT OF R1 AND PLACING THE RESULT IN R2 |
| D to I | RegReg | DOUBLE REAL-TO-INTEGER CONVERSION OF CONTENT OF R1 AND PLACING RESULT IN R2 |

FIG. 11

| STATE SWITCH INSTRUCTIONS 3370 | |
|---|---|
| SaveSt RegMR | SAVE CURRENT PROCESSOR STATE IN MEMORY |
| LoadSt RegMR | RESTORE PROCESSOR STATE IN ACCORDANCE WITH INFORMATION SAVED IN MEMORY |

| NO-OPERATION INSTRUCTION 3380 | |
|---|---|
| Nop Reg0 | PERFORM NO OPERATION |

| PROGRAM STRUCTURE REPRESENTING PSEUDO-INSTRUCTIONS 3390 | |
|---|---|
| Start Cont1 OdSym | PSEUDO-INSTRUCTION FOR STARTING OBJECT HAVING NAME (OF SYMBOL LABEL) INDICATED BY $c_3$ |
| SubP Cont1 OdSym | START OF SUBPROGRAM |
| Block Cont0 | START BLOCK |
| End Cont0 | END BLOCK |
| Loops Cont1 OdLab | INDICATE HEAD OF LOOP STATEMENT HAVING REPETITION STARTING POINT AT LABEL INDICATED BY $c_3$ |
| Loope Cont1 OdLab | INDICATE TRAIL OF LOOP STATEMENT HAVING REPETITION STARTING POINT AT LABEL INDICATED BY $c_3$ |
| Pend Cont0 | END SUBPROGRAM OR UNIT |
| Stmt Cont1 OdCi | INDICATE START POSITION OF STATEMENT HAVING $c_3$ AS STATEMENT NUMBER |

| SYMBOL NAME DESIGNATING PSEUDO-INSTRUCTIONS 3400 | |
|---|---|
| Eentry Cont1 OdSym | PSEUDO-INSTRUCTION INDICATING NAME (OF SYMBOL TABLE) INDICATED BY $c_3$ AS ENTRY NAME |
| Extern Cont1 OdSym | PSEUDO-INSTRUCTION INDICATING THAT NAME (OF SYMBOL TABLE) INDICATED BY $c_3$ IS EXTERNAL NAME |
| Label Cont1 OdLab | DEFINE LABEL INDICATED BY LABEL TABLE $c_3$ |
| Label Cont1 OdCL | DEFINE NAME OF MEMORY CONSTANT INDICATED BY LOGICAL REGISTER NUMBER $c_3$ |
| Label Cont1 OdGvar | DEFINE GENERATED VARIABLE NAME INDICATED BY $c_3$ AS LABEL NAME |
| Name Cont1 OdSym | INSTRUCTION FOR EQUATING NAME INDICATED BY $c_3$ TO THE NAME OF IMMEDIATELY PRECEDING LABEL |

FIG. 12

| MEMORY DESIGNATING PSEUDO-INSTRUCTIONS 3410 | |
|---|---|
| Dconst Cont1 0dCi | CONSTANT DEFINITION DEFINING c3 AS INTEGER CONSTANT VALUE |
| Dconst Cont1 0dCS | CONSTANT DEFINITION REGARDING c3 AS ONE-WORD CHARACTER STRING |
| Dconst Cont1 0dCS | CONSTANT DEFINITION REGARDING c3 AS ONE-WORD CHARACTER STRING CONSTANT |
| Dword Cont1 0dCI | DEFINE STORAGE INSTRUCTION FOR SECURING MEMORY OF c3 WORDS |
| Daddr Cont1 0dSym | DEFINE ADDRESS FOR THE NAME (OF SYMBOL TABLE) INDICATED BY c3 |
| MCode Cont1 0dcl | INSTRUCTION FOR GENERATING MACHINE LANGUAGE MRT[c3] INDICATED BY c3 |

| PSEUDO-INSTRUCTIONS DESIGNATING DEBUGGER-ORIENTED SYMBOL INFORMATION, ETC. 3420 | |
|---|---|
| PInf Cont1 0dCi | INDICATE INFORMATION OF PROGRAM CHARACTERISTIC INFORMATION TABLE RESIDENT AT POSITION INDICATED BY c3 |
| SInf Cont1 0dCi | INDICATE SYMBOL INFORMATION RESIDENT AT POSITION INDICATED BY c3 |

FIG. 13

```
1    int x ;                              3610
2    int a[10], b[10], c[10] ;
3    func ()                              3614
4      { int i, n ;                       3616
       ...
                                          3620
10     for (i=0 ; i<n ; ++i) {
11       if (a[i]>0 {
12         if (a[i]<x)
13           b[i]=1;
             }
14       else c[i]=1 ;
         ...
         }
```

FIG. 14

```
SInf (global, var,                                              ~3700
        ((x, 1, int, 4),
         (a, 2, int, 40, array, 10),
         (b, 2, int, 40, array, 10),
         (c, 2, int, 40, array, 10))) ;
SInf (local, func, var,                                         ~3702
        ((i, 4, int, 4), (n, 4, int, 4))) ;
...
        alloc (Vbase,RcSect,AlcVb,0,0,0x62489700                ~3710
                           +0x00224897) ;
        bblock (1, pred ( ), succ (2)) ;                        ~3712
  Stmt    Cont1   Noreg  Noreg  0dCi  10 ;
  Loops   Cont1   Noreg  Noreg  0dLab L1 ;                      ~3716
        alloc (Ar5,RcArith,Alc5,0,0,0xD1044000                  ~3718
                           +0x00110440) ;
* Load    RegCon  Ar5    Noreg  0dCi  0 ;                       ~3720
* Store   RegMr   Ar5    Vbase  0dDisp i ;                      ~3722
        bblock (2,  pred (1,8), succ (3,7)) ;                   ~3724
  Block   Cont0   Noreg  Noreg  0dNo  Null ;
  Lable   Cont1   Noreg  Noreg  0dLab L1 ;                      ~3728
  Stmt    Cont1   Noreg  Noreg  0dCi  11 ;
        alloc (Ar6,RcAddr,Alc6,2,0,0xE0000000) ;                ~3732
* Load    RegReg  Ar6    Vbase  0dNo  Null ;                    ~3734
* Add     RegReg  Ar6    Ar5    0dNo  Null ;                    ~3736
        alloc (Ar7,RcArith,Alc7,4,0,0xC0000000) ;
* Load    RegMr   Ar7    Ar6    0dDisp a ;                      ~3740
        free (Ar6) ;
* Comp    RegCon  Ar7    Noreg  0dCi  0 ;
        free (Ar7) ;
        BrLe    Const   Noreg  Noreg  0dLab L2 ;                ~3748
```

FIG. 15

```
          bblock (3, pred (2), succ (4,5)) ;                        ~3750
    Block   Cont0  Noreg Noreg  OdNo   Null ;
    Stmt    Cont1  Noreg Noreg  OdCi   12 :
          alloc (Ar8, RcAddr,Alc8,6,0,0xE0000000) ;
*   Load    RegReg  Ar8   Vbase   OdNo   Null ;                     ~3758
*   Add     RegReg  Ar8   Ar5   OdNo   Null ; /* Same as Ar6 */~3760
          alloc (Ar9, RcArith,Alc9,8,0,0xA0000000) ;
*   Load    RegMr   Ar9   Ar8  OdDisp  a ;  /* Same as Ar7 */~3770
          free (Ar8) ;
          alloc (Ar10, RcArith,Alc10,9,0,0xC0000000) ;
*   Load    RegMr   Ar10  Vbase  OdDisp  x ;
*   Comp    RegReg  Ar9    Ar10     OdNo   Null ;
          free (Ar9) ;
          free (Ar10) ;
    BrGe    Const   Noreg Noreg  OdLab  L3 ;                        ~3778
          bblock (4,  pred (3),  succ (5,6)) ;                      ~3780
    Stmt    Cont1   Noreg Noreg  OdCi   13 ;
          alloc (Ar11,RcArith,Alc11,11,0,0x90000000) ;
*   Load    RegCon  Ar11  Noreg  OdCi   1 ;                         ~3786
          alloc (Ar12,RcAddr,Alc12,12,0,0xC0000000) ;
*   Load    RegReg  Ar12  Vbase  OdNo Null ;                        ~3790
*   Add     RegReg  Ar12  Ar5   OdNo Null ; /* Same as Ar6 */~3792
*   Store   RegMr   Ar11  Ar12 OdDisp  b ;
          free (Ar12) ;
          free (Ar11) ;
    End     Cont0  Noreg  Noreg  OdNo   Null ;
```

FIG. 16

```
        Jump  Const   Noreg  Noreg  OdLab  L4 ;              ~3802
           bblock (5, pred (3), succ (8)) ;
        Label Cont1   Noreg  Noreg  OdLab  L3 ;              ~3806
        Jump  Const   Noreg  Noreg  OdLab  L5 ;              ~3808
           bblock (6, pred (4, succ (8)) ;
        Label Cont1   Noreg  Noreg  OdLab  L4 ;              ~3812
        Jump  Const   Noreg  Noreg  OdLab  L5 ;              ~3814
           bblock (7, pred (2), succ (8)) ;
        Label Cont1   Noreg  Noreg  OdLab  L2 ;
        Stmt  Cont1   Noreg  Noreg  OdCi   14 ;
           alloc (Ar13, RcArith, Alc13,15,0,0x90000000) ;
  *     Load  RegCon  Ar13   Noreg  OdCi 1 ; /* Same as Ar11 */
           alloc (Ar14, RcAddr, Alx14,16,0,0xE0000000) ;      ~3828
  *     Load  RegReg  Ar14   Vbase  OdNo Null ;
  *     Add   RegReg  Ar14   Ar5    OdNo Null ; /* Same as Ar6 */~2830
  *     Store RegMr   AR13   Ar14   OdDISP c ;
           free (Ar13) ;
           free (Ar14) ;
        End   Cont0   Noreg  Noreg  OdNo  Null ;
           bblock (8, pred (5,6,7), succ (2,9)) ;             ~3840
        Label Cont1   Noreg  Noreg  OdLab  L5 ;
           alloc (Ar15, RcArith, Alc15,19,0,0xE0000000) ;
  *     Load  RegMr   Ar15   Vbase  OdDisp j ; /* Same as Ar5*/~3846
  *     Add   RegCon  Ar15   Noreg  OdCi 1 ;
  *     Store RegMr   Ar15   Vbase  OdDisp i ;                ~3850
           free (Ar15) ;
           alloc (Ar16,RcArith,Alc16,22,0,0xA0000000) ;
  *     Load  RegMr   Ar16   Vbase  OdDidp i ; /* Same as Ar15 */~3856
           alloc (Ar17,RcArith,Alc17,23,0,0xC0000000) ;
  *     Load  RegMr   Ar17   Vbase  OdDisp n ;                ~3860
  *     Comp  RegReg  Ar16   Ar17   OdNo Null ;
           free (Ar16) ;
           free (Ar17) ;
        BrLe  Const   Noreg  Noreg  OdLab  L1 ;               ~3868
           free (Ar5) ;
           bblock (9, pred (8), succ (10)) ;
        Loope Cont1   Noreg  Noreg  OdLab  L1 ;               ~3874
        ...
```

FIG. 17

PRIORITY BIT VECTOR OF Vbase UPON ALLOCATION
0110001001001000100101011100000000    0x62489700+    3910
0000000000000100010010001000100010111    0x00224897    3912

PRIORITY BIT VECTOR OF Vbase AT START OF LOOP
1000100100100010010101111000000000    0x89225C00+    3914
0000000000000100010010001000101011100    0x0089225C    3916

PRIORITY BIT VECTOR OF Ar5 UPON ALLOCATION
1101000100001000100000000000000    0xD1044000+    3918
0000000000000000010001000001000001000000    0x00110440    3920

PRIORITY BIT VECTOR OF Ar5 AT START OF LOOP
0100010000001000100000000000000    0x44110000+    3922
0000000000000000100010001000100000000000    0x00441100    3924

FIG. 20

```
SInf (global, var,
       ((x, 1, int, 4),
        (a, 2, int, 40, array, 10),
        (b, 2, int, 40, array, 10),
        (c, 2, int, 40, array, 10))) ;
SInf (local, func, var,
       ((i, 4, int, 4), (n, 4, int, 4))) ;
...
    alloc (Vbase,RcSect,AlcVb,0,0,0x5C040000
                                    +0x00404000) ;
    bblock (1, pred ( ), succ (2)) ;        Vbase
  Stmt    Cont1  Noreg Noreg 0dCi 10 ;        |
  Loops   Cont1  Noreg Noreg 0dLab L1 ;       |
    alloc (Ar5,RcArith,Alc5,0,0,0xC20E0000+0x0020E000) ;   ~4028
*  Load   RegCon Ar5   Noreg 0dCi 0 ;        |   5       ~4030
*  Store  RegMr  Ar5   Vbase 0dDisp i ;      Vb  |        ~4032
    alloc (Ar11,RcArith,Alc11,2,4,0x80800000+0x00080000) ;
    if (Alc11)  {                            |   |
*  Load   RegCon Ar11  Noreg 0cCi 1 ; }      |   |  11    ~4038
    alloc (Ar10,RcArith,Alc10,3,3,0x82000000+0x00200000) ;
    if (Alc10)  {                            |   |   |
*  Load   RegMr  Ar10  Vbase 0dDisp x ; }    Vb  |   |  10 ~4044
    alloc (Ar17,RcArith,Alc17,4,2,0x80200000+0x00020000) ;  ~4046
    if (Alc17)  {                            |   |   |   | ~4048
*  Load   RegMr  Ar17  Vbase 0dDisp n ; }    Vb  |   |   | 17~4050
```

FIG. 21

```
         bblock (2, pred (1,8), succ (3,7)) ;      | |        | | |
    Label   Cont1   Noreg Noreg  OdLab L1 ;        | |        | | |
    Stmt    Cont1   Noreg Noreg  OdCi  11 ;        | |        | | |
         alloc (Ar6, RcAddr,Alc10,5,0,0xE6000000) ;
*   Load    RegReg  Ar6   Vbase  OdNo  Null ; Vb | 6           | | |
*   Add     RegReg  Ar6   Ar5    OdNo  Null ;  | |             | | |
         alloc (Ar7, RcArith,Alc7,7,0,0xE0000000) ;
*   Load    RegMr   Ar7   Ar6    OdDisp a ;    | | | 7         | | |
*   Comp    RegCon  Ar7   Noreg  OdCi  0 ;     | | | 7         | | |
    BrLe    Const   Noreg Noreg  OdLab L2 ;    | | | |         | | |
         bblock (3, pred (2), succ (8)) ;      | | | |         | | |
    Stmt    Cont1   Noreg Noreg  OdCi  12 ;    | | | |         | | |
*   Comp    RegReg  Ar7   Ar10   OdNo  Null ;  | | | 7 10 |    |  ~4076
         free (Ar7) ;                          | | | f  |      |
         if  (!Alc10) free (Ar10) ;            | | |    f |    |
    BrGe    Const   Noreg Noreg  OdLab L5 ;    | | |           | | |
         bblock (4, pred (3), succ (4,8)) ;    | | | |         | | |
    Stmt    Cont1   Noreg Noreg  OdNo  Null ;  | | |           | | |
*   Store   RegMr   Ar11  Ar6    OdDisp b ;    | | | 11        | |
    Jump    Const   Noreg Noreg  OdLab L5 ;    | | | |         | |
         bblock (7, pred (2), succ (8)) ;      | | | |         | |
    Label   Cont1   Noreg Noreg  OdLab L2 ;    | | | |         | |
    Stmt    Cont1   Noreg Noreg  OdCi  14 ;    | | | |         | |
*   Store   RegMr   Ar11  Ar6    OdDisp c ;    | | 6 11        | |
         free (6) ;                            | | f |         |  ~4098
         if  (!Alc11) free (Ar11) ;            | |   f         | |
         bblock (8, pred (3,4,7), succ (2,9)) ; | |            | | |
    Label   Cont1   Noreg Noreg  OdLab L5 ;    | |             | | |
*   Add     RegCon  Ar5   Noreg  OdCi  1 ;     | 5             | | | ~4108
*   Store   RegMr   Ar5   Vbase  OdDisp i ;    Vb 5            | | | ~4110
*   Comp    RegReg  Ar5   Ar17   OdNo  Null ;  | 5 17          | |   ~4112
         if  (!Alc11) free (Ar17) ;            | | f           | |
    BrLe    Const   Noreg Noreg  OdLab L1 ;    | |             | | |
         if  (Alc11)  free (Ar11) ;            | |             f | |
         if  (Alc10)  free (Ar10) ;            | |               f |
         if  (Alc17)  free (Ar17) ;            | |                 f
         free (Ar5) ;                          | f
         bblock (9, pred (8), succ (10)) ;     |
    Loope   Cont1   Noreg Noreg  OdLab L1 ;    |
    ....
```

```
RcArith   = [ 8 .. 23] ;              ~4260
RcAddr    = [16 .. 23] ;              ~4262
RcSect    = [20 .. 23] ;              ~4264
RcReturn  = [31] ;                    ~4266
RcFuncval = [ 2 .. 3] ;               ~4268
RcParm    = [ 4 .. 7] ;               ~4270
RcNosave  = [ 8 .. 15, 24, 25] ;      ~4272
RcTemp    = [24 .. 25] ;              ~4274
RcFixed   = [ 0, 1, 26, 27, 28, 29, 30, 31] ; ~4276
RcAny     = [ 0 .. 31] ;              ~4278
```

FIG. 26

```
    Load  RegCon Reg1 Noreg OdCi C                              ~4300
       {if ($C<65536) && ($C >= 0)                              ~4302
           gen('ori ', $Reg1, '$0', $C, null, null) ;           ~4304
         else {
           gen('iui', $Reg1, $C/65536, null, null, null) ;      ~4308
           gen('ori', $Reg1, $Reg1, $C %65536, null, null) ; } ;
       }                                                         4310
|   Load  RegMr Reg1 Reg2 OdDisp V                              ~4312
       {gen('lw', $Reg1, $V, ' (', $Reg2, ')') ;
       }
|   Load  RegReg Reg1 Reg2 OdNo Null
    Add   RegReg Reg1 Reg3 OdNo Null                            ~4316
       {gen('add ', $Reg3, $Reg2, $Reg1, null, null) ;
       }
|   Store RegMr Reg1 Reg2 OdDisp V
       {gen('sw ', $Reg1, $V, ' (', $Reg2, ')') ;
       }
|   Add   RegCon Reg1 NoReg OdCi C
       {if ($C<32768) && ($C >= -32768)
          gen('addi ', $Reg1, $Reg1, $C, null, null) ;
        else {
          gen('lw ', '$24', '=', $C, null, null) ;
          gen('add', $Reg1, $Reg1, '$24', null, null) ; } ;
       }
|   Comp  RegCon Reg1 Noreg OdCi 0
    BrLe  Const Noreg Noreg OdLab L
       {gen('blez ', $Reg1, Label($L), null, null, null) ;
       }
|   Comp  RegReg Rea1 Reg3 OdNo Null
    BrGe  Const Noreg Noreg OdLab L
       {gen('sub ', $Reg1, $Reg2, '$24', null, null) ;
        gen('bgez','$24', Label($L), null, null, null) ;
       }
|   Jump  Const Noreg Noreg OdLab L
       {gen('j ', Label(&L), null, null, null, null) ;
       }
```

FIG. 27

```
Ar5   -> $08, Ar6  -> $17, Ar7  -> $09,   ~4400
Ar10  -> $10, Ar11 -> $11, Ar17 -> $12,
Vbase -> $16
```

FIG. 28

```
        ori    $08, $0, 0           ~4500
        sw     $08, i ($16)
        ori    $11, $0, 1
        lw     $10, x ($16)
        lw     $12, n ($16)
L01:    add    $16, $08, $17
        lw     $09, a ($17)
        blez   $09, L02
        sub    $24, $9, $10
        bgez   $24, L05
        sw     $11, b ($17)
        j      L05
L02:    sw     $11, c ($17)
L05:    addi   $08, $08, 1
        sub    $24, $08, $12        ~4526
        blez   $24, L01
```

FIG. 31

| | | |
|---|---|---|
| RcArith | =[1..7, 16..23] ; | ~4600 |
| RcAddr | =[1..7, 16..23] ; | ~4602 |
| RcSect | =[1..7] ; | ~4604 |
| RcReturn | =[31] ; | |
| RcFuncval | =[8..13] ; | |
| RcParm | =[24..29] ; | |
| RcNosave | =[16..23] ; | |
| RcTemp | =[15] ; | ~4616 |
| RcFixed | =[0, 14, 30, 31] ; | |
| RcAny | =[0..31] ; | |

FIG. 33

```
  Load RegCon Reg1 Noreg 0dCi C                                    ~4700
    {if ($C<4096) && ($C >= -4096)
        gen('or', '%0', $Reg1, null, null) ;
     else {
        gen('sethi ', $C/4096, $Reg1, null, null, null) ;
        gen('or ',$Reg1, $C % 4096, $Reg1, null, null) ;} ;
    }
| Load RegMr Reg1 Reg2  0dDisp V                                   ~4712
    {gen('ld', $Reg2, '+', $V, $Reg1, null) ;
    }
| Load RegReg Reg1 Reg2 0dNo Null                                  ~4716
  Add  RegReg Reg1 Reg3 0dNo Null
    {gen('add ', $Reg2, $Reg3, $Reg1, null, null) ;
    }
| Store RegMr Reg1 Reg2 0dDisp V                                   ~4722
    {gen('st ', $Reg1, $Reg2, '+', $V, null) ;
    }
| Add RegCon Reg1 NoReg 0dCi C
    {if ($C<4096) && ($C >= -4096)
       gen('add ', '%0', $C, $Reg1, null, null) ;
     else {
        gen('id ', '=', $C, '%15', null, null) ;
        gen('add', $Reg1, '%15', $Reg1, null, null) ; } ;
    }
| Comp RegCon Reg1 Noreg 0dCi 0
  BrLe Const Noreg Noreg 0dLab L
    {gen('sub ', $Reg1, '%0', $Reg1, null, null) ;
     gen('ble ', Label($L), null, null, null, null) ;
    }
| Comp RegReg Rea1 Reg3 0dNo Null
  BrGe Const Noreg Noreg 0dLab L
    {gen('sub ', $Reg1, $Reg2, ''%15', null, null) ;
     gen('bge ', Label($L), null, null, null, null) ;
    }
| Jump Const Noreg Noreg 0dLab L
    {gen('ba ', Label(&L), null, null, null, null) ;
    }
```

FIG. 34

```
Ar5   -> %16,  Ar6  -> %20,  Ar7  -> %21,    ~4780
Ar10  -> %18,  Ar11 -> %17,  Ar17 -> %19,
Vbase -> %7
```

FIG. 35

```
        or    %0, %16           ~4800
        st    %16, %7+i         ~4802
        or    %0, 1, %17
        ld    %7+x, %18
        ld    %7+n, %19
L1:     add   %7, %16, %20
        ld    %20+a, %21
        sub   %21, %0, %15
        ble   L2
        sub   %21, %18, %15
        bge   L5
        st    %17, %20+b
        ba    L5
L2:     st    %17, %20+c
        add   %16, 1, %16
        sub   %19, %16, %15
        ble   L1
```

FIG. 44

| STATEMENT NUMBER (5160) | DESCRIPTION OF SOURCE PROGRAM (5161) |
|---|---|
| 1 | int x ; |
| 2 | int a [10], b [10], c [10] ; |
| 3 | func ( ) |
| 4 | { int i, n ; |
| ... | .... |
| 10 | for (i=0 ; i<n ; tti) ; |
| 11 | if (a [i] >0 ; |
| 12 | if (a [i] <x) |
| 13 | b [i]=1 ; <br> } |
| 14 | else c [i]=1 ; |
| ... | .... |

FIG. 45A  STATEMENT INFORMATION TABLE

| SOURCE PROGRAM NUMBER (5170) | ABSTRACT OBJECT PROGRAM INSTRUCTION ADDRESS (5171) | MACHINE LANGUAGE PROGRAM INSTRUCTION ADDRESS (8172) | BREAK POINT SETTING FLAG (5173) |
|---|---|---|---|
| 10 | 000060 | 000040 | on |
| 11 | 000068 | 000054 | off |
| 12 | 00007C | 00005C | off |
| 13 | 000094 | 000064 | off |
| 14 | 0000A4 | 00006C | off |
| 15 | 0000B0 | 00007C | off |
| 16 | 0000C0 | 000080 | off |

5174

FIG. 45B  VARIABLE INFORMATION TABLE

| VARIABLE NAME (5175) | CLASS OF VARIABLE (5178) | TYPE (5177) | STATEMENT NUMBER (5178) | MACHINE LANGUAGE ADDRESS (5179) |
|---|---|---|---|---|
| i | local | int | 4 | -4 |
| n | local | int | 4 | -8 |
| x | global | int | 1 | 32 |
| a | global | int array | 2 | 36 |
| b | global | int array | 2 | 76 |

5180

COMPILER SYSTEM USING AN INTERMEDIATE ABSTRACT FORM AND MACHINE-SPECIFIC INSTALLERS

BACKGROUND OF THE INVENTION

The present invention relates to a translation system for translating a source program into a machine language program by using an electronic computer and, more particularly, to a translation system off the type mentioned above in which an object program common to a plurality of target computers or machines of different types can be profitably employed.

Systems for allowing programs described in high-level languages to be executed on the target computers or machines are generally classified into two systems respectively referred to as a compiler system and an interpreter system.

In the compiler system, a program described in a high-level language is translated into a machine language program oriented to a target computer, and the machine language program is executed straightforwardly by the target machine.

On the other hand, in the case of the interpreter system, a language (referred to as the intermediate language) which differs from the machine language of the target computer is prepared along with a program (referred to as the interpreter) which is adapted to interpret and execute the intermediate language program on the target computer. In other words, the high-level language program is translated into the intermediate language program which is then executed by the target computer or machine on which the interpreter program runs.

One of advantages of the compiler system over the interpreter system is seen in the greater speed of program execution which can be explained by the facts mentioned below.

(1) In the interpreter system, there are required in addition to the execution of a machine language program corresponding to an intermediate language program, allocation of the processings for the intermediate language codes as well as address calculation for operands and others. On the other hand, in the compiler system, such processing allocation and address calculation are rendered unnecessary because the machine language program can be executed directly in a straightforward manner.

(2) In the compiler system, sparing or deletion of some of the processings is possible by taking into consideration the context of program and characteristics of the target computer (i.e. program optimization can be realized). In contrast, the interpreter can only execute the intermediate language program as it is because of its universal application to intermediate languages and thus the interpreter is not in the position to allow any processing to be spared or omitted in consideration of the program context. Besides, since the characteristics of the target computer or machine are not reflected onto the intermediate language program, it is impossible to speed up the processing by resorting to, for example, mapping of specific variables described in a high-level language to the registers incorporated in the target machine.

On the other hand, as to the usage of a program destined to be executed repeatedly, there has heretofore been adopted either one of the two methods mentioned below.

(1) According to a first method, the compiler system is adopted, wherein the machine language program obtained through the translation is preserved or stored so as to be repeatedly executed in a straightforward manner.

(2) According to the other method, the interpreter system is adopted, wherein the intermediate language program is stored for allowing repeated executions thereof by the interpreter.

When one program is to be executed repeatedly, the compiler system is adopted by an overwhelming majority of systems from the viewpoint of reducing of the time involved in execution of the program. However, the compiler system suffers from the shortcomings described below.

(1) It is necessary to provide the compiler for translating a source program into a machine language program for each type of target machine, which means that not only the quantity of compilers to be developed must necessarily increase but also the overhead involved in maintenance and extension is significantly increased because the maintenance and extension must be performed so as to be compatible with the machine types of the target computers.

(2) When one and the same program is to be executed by a plurality of target computers of different machine types, compilation (i.e. translation from a source program to a machine language program) is required for each of the machine types of the target computers, which results in the overhead for the management of the machine language programs increasing greatly.

(3) In an environment in which a plurality of computers of different machine types are connected to a network, a number of machine language programs which correspond to the number of the computers connected to the network are required for one and the same source program, which gives rise to problems with regards to the version management and disk space availability. Moreover, difficulty will be encountered in distributed execution of one and the same program.

(4) Some of the systems actually used are often operated with only the machine language program without any source program being given. In such system, exchange or switching and alterations of the component machines is difficult to realize. At present, progress in hardware technology facilitates implementation of highly sophisticated computer architecture. Nevertheless, inheritance of the machine language program resources imposes a serious limitation to alteration or modification of computer architecture.

For overcoming the disadvantages of the compiler system mentioned above, a system may be conceived in which an intermediate language program which is independent off any specific machine is employed for the purpose of preservation or storage and management of the program, wherein upon execution, the intermediate language program is translated into a machine language program of a target machine for thereby realizing high-speed processing, i.e. a system which adopts only the advantageous features of the compiler system and the interpreter system in combination. In the present state of art, however, there is known no real system which realizes the concept mentioned above.

For details of the compiler system and the interpreter system, reference may be made to "A. Aho, R. Seti and J. Ullman: Compilers. Principles, Techniques and Tools", Addison-Wesly, 1986, pp. 1–24.

In order to allow a machine-independent intermediate language program (i.e. intermediate language program which is independent of any specific target machine or computer) to be adopted as a form for preservation and management of a program to be executed repeatedly, it is required that the intermediate language program can be executed at a speed comparable to that of execution of the machine language program in the existing compiler system.

To this end, fulfillment of the requirements mentioned below will be indispensable.

(1) The intermediate language program which is in the form suited for the preservation and management as described above is not executed by the interpreter but translated into a machine language program immediately before execution.

(2) In the course of translation or conversion of the intermediate language program into the machine language program, optimization of the program is carried out by taking into consideration the characteristics of the target computer which is to execute that program.

With the present invention, it is contemplated to provide a consolidated or integrated system which can realize the requirements mentioned above, i.e. to provide a practical form of an intermediate language for storage and management of the intermediate language program together with a practical method of effectuating the translation of the intermediate language program into the machine language program upon start of execution of the program while optimizing the machine language program for the target computer.

In this conjunction, it is noted that the intermediate language code designed for the interpreter system cannot be used as the intermediate language codes for realizing what is contemplated with the present invention for the reasons described below.

(1) The intermediate language code for the interpreter system contains no information required for optimization to be effectuated upon translation into the machine language program because the intermediate language codes are not designed on the premise that it undergoes the optimization by the interpreter.

(2) The computers may be globally classified into a register machine which includes a finite number of registers and in which operations are performed primarily on the registers and a stack machine which includes operation stacks, wherein the operations or computation are performed primarily on the stack. In the current state of the art, a majority of the existing computers are implemented as the register machines. By contrast, many of the intermediate languages for the interpreter systems are designed on the presumption of operation on the stack because of the ease in designing the intermediate language codes and the interpreter. Of course, it is not absolutely impossible to convert the on-stack operation to the operation on the registers. However, great difficulty will be encountered in translating the intermediate language program for the stack machine into an efficient and effective machine language program for the register machine, when considering the fact that the values on the stack are inherently assumed to be disposable, while those on the registers should rationally be used repetitively as far as it is possible in order to make the most of the registers with high efficiency.

SUMMARY OF THE INVENTION

It is therefore an object of the present invention to provide information processing method and system in which an intermediate language program independent of any specific computer or machine is used for storage, management and the like purpose and translated into a machine language program appropriate for a target machine immediately before execution of the program by the target machine. More specifically, it is contemplated with the present invention to provide an information processing system which can fulfill the requirements described below.

(1) In designating a register machine as the target machine (i.e. execution-destined computer), the intermediate language program should have such an instruction sequence in which the existence of registers is presumed at the very basic level of the intermediate language program. Besides, in the course of translation up to the intermediate language program, optimization should have been effectuated to a possible extent.

(2) Upon translation into the machine language program from the intermediate language program, a register utilization method should be able to be optimized. More specifically, utilization of the registers should be so determined that the number of times the instructions for loading and storing values to and from registers should be reduced to a minimum while allowing unnecessary instructions to be deleted. Moreover, information requisite for the optimization should be derived from the intermediate language program.

(3) In some case, a specific sequence (a series of plural instructions) in the intermediate language program can be replaced by an instruction peculiar to the target machine. In such a case, it is generally preferred, from the standpoint of efficiency, to effectuate the replacement by one machine language instruction. Accordingly, when a machine language instruction corresponding to a succession of intermediate language is made available by the target machine, a machine language program should be generated such that the corresponding machine language instruction mentioned above can be used.

Aspects of the present invention in general may be summarized as follows.

1. System structure

According to an aspect of the present invention, a system for translating a source program into a machine language program for an execution-destined computer or target machine is composed of three subsystems. They are:

(1) a compiler: a subsystem for generating an object program (referred to as abstract object program) which is independent of the type of target machine, (2) a linker: a subsystem for linking together a plurality of abstract object programs generated by the subsystem compiler into a single abstract object program, and (3) an installer: a subsystem for translating the abstract object program output from the linker into a machine language program for the target machine (which may also be referred to as the target computer, execution-destined machine or the like).

2. Form of object program

In order to make the object program common to a plurality of target machines, an abstract register machine (also referred to as ARM or Arm in abbreviation) having a plurality of registers is presumed, wherein an instruction sequence for the abstract register machine or ARM is made use of as a basic part of the common object program (referred to as the abstract object program).

The abstract register machine or ARM has features mentioned below.

(1) The ARM has a plurality of abstract registers. (Although the number of the abstract registers is infinite in principle, limitation is imposed depending on the form of the abstract object program in practical applications.)

(2) The ARM has as the instruction executing functions a register-memory data transfer function, function for performing operations on the registers (such as four arithmetic operations, logical operations, shift operations, comparisons) and an execution control function (such as unconditional branch, conditional branch, call and restoration of subprograms, etc.).

(3) Memory addresses are represented by symbol names rather than numerical values.

The reason why the instruction sequence of the abstract register machine or ARM including a plurality of registers is made use of as the basic part of the common object can be explained as follows:

(a) In order to speed up the translation of the object program into machine language programs appropriate to the individual target machines, respectively, it is desirable to reduce as much as possible, semantic gaps between the object program and the machine language. In conjunction, it is to be noted that the computation machine used widely at present is a register machine having a plurality of registers. Accordingly, by presuming the abstract register machine having as an instruction set a semantically common part of the instruction sets of the conventional register machines, overhead involved in the semantically meaningful translation can be reduced, whereby the translation to the machine language program can be speeded up.

(b) In the register machine, one of the keys for speeding up execution of the machine language program is effective utilization of the registers. Thus, by regarding the abstract register machine or ARM as a target machine for the compiler, the latter can generate a an instruction sequence which can make use of the registers to a the greatest possible extent.

The abstract object program is composed of:

(a) instruction sequence ARM, (b) pseudo-codes such as definitions of labels concerning branch, entry, variable and constant, embedded information for the optimization, and embedded information for the debugging at the source program level, (c) generation control specifiers (indicating allocation/deallocation of abstract registers and selection of an ARM instruction sequence in the state in which the abstract registers have been allocated), and (d) dictionaries of variable names and index names for reference in the debugging at the level of the source program.

Although the type of the abstract register can be indicated by the generation control specifier for the abstract registers, it is impossible to designate to which of the registers in the real machine the indicated abstract register correspond. In this manner, the registers can be surfaced up in the abstract object program independent of the type of the target machine.

3. Specification of target machine

In order to allow the machine language programs for the target machine to be generated from the abstract object program, two types of information mentioned below are prepared for the installer:

(i) indication concerning the usage of the register in the target machine (types and number of the usable registers), and (ii) translation rules for translation of the instruction sequence pattern of the ARM into an instruction sequence pattern for the target machine.

At this juncture, it should be mentioned that the ARM instruction pattern and that of the target machines are each composed of a plurality of instructions.

The instructions of the ARM and those of the target machine are not set in a one-to-one correspondence relationship, the reason for which is explained as follows.

(1) In a strict sense, the ARM instruction set cannot constitute a common part of real machine instruction sets. Accordingly, there may arise such a situation in which the instruction corresponding to that of the ARM is absent in the instructions executed by a target machine. In that case, it is necessary to realize one ARM instruction by several instructions of the target machine.

(2) There may arise a situation which is reverse to that mentioned above. In other wards, the instruction sequence executed by the target machine may include an instruction which corresponds to a sequence of several ARM instructions, as exemplified by a register-memory operation instruction and the like. In this case, the ARM instruction sequence is handled as one target machine instruction, because the processing speed can be enhanced by decreasing the number of instructions to be executed by the target machine.

4. Method of translating the abstract object program into a machine language program for a target machine.

The installer includes a table for managing correspondence between the abstract registers of the ARM and the real registers of the target machine (this table will hereinafter be referred to as the register management table) and performs operations mentioned below.

(1) In response to an abstract register allocation command for the abstract registers in the abstract object program, the installer attempts to establish correspondence between an abstract register and a real register. In that case, when there exists a real register for which correspondence with other abstract register has not been established within a range described in register usage indication of the target machine specifications, i.e. where there is found an idle real register, correspondence is established between the aforementioned abstract register and the idle real register.

(2) In response to a register releasing or freeing command contained in the abstract object program, the installer clears the correspondence relation between the abstract register and the real register (i.e. deallocation is executed by the installer).

(3) With the aid of the generation control specifier contained in the abstract object program, the installer checks whether or not an abstract register is set in correspondence relation with a real register, whereon an ARM instruction sequence is selected.

(4) For the ARM instruction sequence thus selected, the installer applies translation rules contained in the target machine specifications for translating the ARM instruction sequence pattern into a target machine instruction sequence pattern, to thereby generate a target machine instruction sequence corresponding to the selected ARM instruction sequence while replacing the abstract register identification number by that of the real register.

(5) For the target machine instruction sequence thus generated, the installer converts the symbol name representing the memory address into numeric addresses.

The compiler which may be implemented by applying compiler techniques known heretofore serves for translation of a source program into an abstract object program. Simultaneously, the compiler performs optimization at the source program level as well as optimization of the ARM instructions for which utilization of the registers is required.

In this way, the installer generates a machine language program for a target machine from an abstract object program in conformance with the target machine specifications.

Thus, the machine language program for the target machine as generated by the system according to the invention has the features mentioned below.

(1) Optimization at the source program level as well as optimization of the register utilization is realized by the compiler.

(2) Due to the real register allocation function of the installer, the registers incorporated in the target machine can be made use of to a maximum extent.

(3) Owing to the instruction sequence pattern replacing capability or function of the installer, it is possible to replace a succession of plural ARM instructions by one instruction for the target machine, to thereby make the most of high performance by the target machine. As a result, an object program can be shared by a plurality off different machine type computers while maintaining the execution speed and performance which are equivalent to those involved in the execution of the machine language program generated by the prior art system (prior art compiler system).

BRIEF DESCRIPTION OF THE DRAWINGS

FIG. 4 is a view for illustrating types of generation control statements contained in an abstract register machine instruction;

FIG. 5A is a view for illustrating a format of an abstract register machine instruction;

FIG. 5B is a table defining objects represented by operands in the abstract register machine instruction;

FIG. 6 is a view for illustrating relations between address modes and operands in abstract register machine instructions;

FIG. 7 is a first part of a view showing specifications of a machine language generation instruction contained in the abstract register machine instruction;

FIG. 8 is a second part of the view showing specifications of a machine language generation instruction contained in the abstract register machine instruction;

FIG. 9 is a third part of the view showing specifications of a machine language generation instruction contained in the abstract register machine instruction;

FIG. 10 is a fourth part of the view showing specifications of a machine language generation instruction contained in the abstract register machine instruction;

FIG. 11 is a fifth part of the view showing specifications of a machine language generation instruction contained in the abstract register machine instruction;

FIG. 12 is a sixth part of the view showing specifications of a machine language generation instruction contained in the abstract register machine instruction;

FIG. 13 is a view for illustrating an example of the source program which is input to the compiler shown in FIG. 2;

FIG. 14 is a first part of a view showing an example of the abstract object program corresponding to the source program shown in FIG. 13 in the state not yet optimized;

FIG. 15 is a second part of the view showing an example of the abstract object program corresponding to the source program shown in FIG. 13 in the state not yet optimized;

FIG. 16 is a third part of the view showing an example of the abstract object program corresponding to the source program shown in FIG. 13 in the state not yet optimized;

FIG. 17 is a view for illustrating a process of calculating priorities of register allocations in the abstract object program shown in FIGS. 14 to 16;

FIG. 20 is a first part of a view showing an example of the abstract object program corresponding to the source program shown in FIG. 13 for illustrating an abstract register machine instruction sequence resulting from optimization processing;

FIG. 21 is a second part of the view showing an example of the abstract object program corresponding to the source program shown in FIG. 13 for illustrating an abstract register machine instruction sequence resulting from optimization processing;

FIG. 26 is a view showing a part of machine instruction selecting rules oriented for the target machine A;

FIG. 27 is a view showing a state in which physical registers in the target machine A are allocated to the abstract object program shown in FIGS. 20 to 21;

FIG. 28 is a view showing a machine language program which is generated from the abstract object program shown in FIGS. 20 and 21 by an installer for the target machine A;

FIG. 31 is a view showing usages of the physical registers in a target machine B;

FIG. 33 is a view showing a part of the machine instruction selecting rules oriented for the machine B;

FIG. 34 is a view showing a state in which the physical registers of the machine B are allocated to the abstract object program shown in FIGS. 19 and 20;

FIG. 35 is a view showing an example of machine language program generated by the installer for the machine B from the abstract object program shown in FIGS. 19 and 20;

FIG. 44 is a view showing an example of the source program which is subject to the debugging;

FIG. 45A is a view showing an example of a source/abstract object/machine language correspondence table;

FIG. 45B is a variable information table defining names of variables in the source program;

DESCRIPTION OF THE PREFERRED EMBODIMENTS

Now, the present invention will be described in detail in conjunction with exemplary or preferred embodiments by reference to the accompanying drawings.

Figure 1:
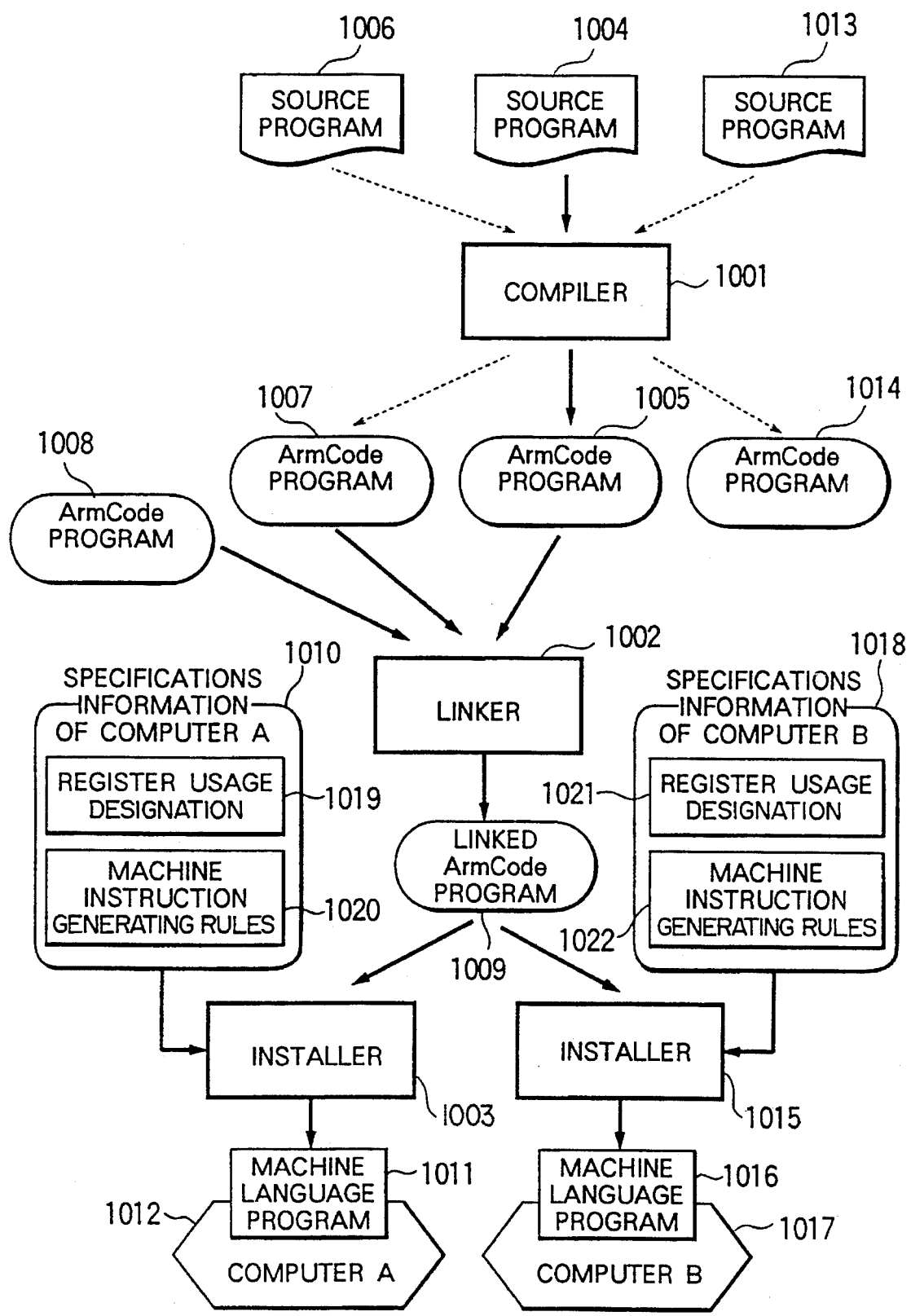
FIG. 1 is a diagram schematically showing a general arrangement of a translation system for translation of a source program into a machine language program according to an embodiment of the present invention.

FIG. 1 is a diagram showing an exemplary structure of a translation system for translating a source program into a machine language program, according to an embodiment of the present invention.

The translation system includes three subsystems. They are a compiler 1001, a linker 1002 and a installer 1003, respectively.

When a source program 1004 is input to the compiler 1001, the compiler 1001 performs a syntax analysis, a semantic analysis, an optimization processing (described hereinafter) and others on the source program 1004, at the representation level of the source program, to thereby output an ArmCode (Abstract register machine code) program 1005 which is an abstract object program. At this juncture, it should be noted that the ArmCode program is provided according to one of the aspects of the present invention, and the specifications of the ArmCode program will hereinafter be elucidated in detail by reference to FIGS. 4 to 12. As to the compiler 1001, a structure thereof will be described by referring to FIG. 2, while the optimization processing performed by the compiler will be described later on in detail by reference to FIGS. 13 to 22.

The linker 1002 receives the ArmCode program 1005 generated from the source program 1004 by the compiler 1001, another ArmCode program 1007 generated similarly from another source program 1006 by the compiler 1001 and an ArmCode program library 1008, and performs solution of problems concerning a relation between routines referenced to by the programs and a relation between variables or constants referenced to as well as integration of data areas and that of instruction areas, as a result of which a linked ArmCode program 1009 is output from the linker 1002. The function of the linker itself is equivalent to a part of the function of the object program linkage editor known heretofore if the ArmCode program is regarded as a conventional machine language. Accordingly, any further description of the linker 1002 will be unnecessary.

The installer 1003 is loaded with the linked ArmCode program 1009 to perform a real register allocation, selection or generation of machine instructions and a machine-dependent optimization with the aid of register usage designation 1019 and machine instruction generating rules 1020 which are contained in specifications information 1010 of a target machine or computer A 1012 and then the installer 1003 develops a machine language program 1011 on a memory of the target machine A 1012. The processings carried out by the installer also constitutes one of the aspects of the present invention and will be described in detail later on by reference to FIGS. 23 and 30. The computer or machine A 1012 executes the machine language program 1011 developed in the manner as mentioned above.

In case the ArmCode program 1014 generated from the source program 1013 by the compiler 1001 requires no linkage with anyone of ArmCode programs and the ArmCode program library 1008, as shown in FIG. 1, the installer 1003 can be loaded with the ArmCode program 1014 straightforwardly to thereby deliver the same to a corresponding machine language program.

The installer 1003 generates the machine language program for the computer of the machine type A hereinafter referred to as the machine A. On the other hand, another installer 1015 serves to generate a machine language program 1016 for a machine B 1017 by using specifications information 1018 of the target machine B. In this manner, the translation system now according to the present invention is capable of generating from the same linked ArmCode program 1009 or the single ArmCode program 1014 a plurality of machine language programs such as those exemplified by the machine language programs 1011 and 1016 for a plurality of target machines such as exemplified by the computers A 1012 and B 1017 to thereby allow these target machines to execute the relevant programs, respectively. As will be appreciated from the above description, the translation system according to the invention can generate, from the same ArmCode program, a plurality of machine language programs for a plurality of target machines or computers of the specifications differing from one another, an example of which will hereinafter be described in more detail by reference to FIGS. 31 to 35.

Figure 2:
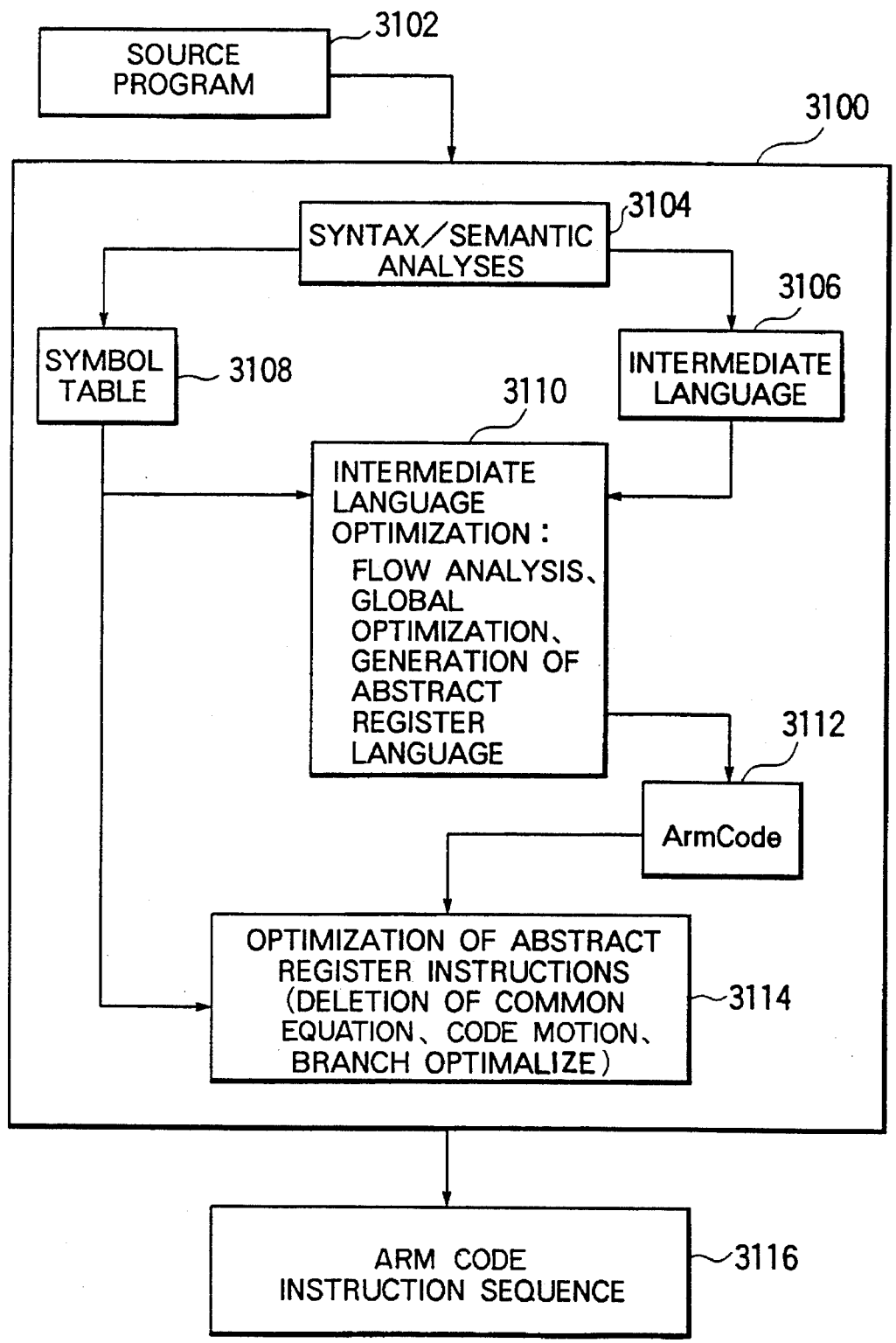
FIG. 2 is a diagram schematically showing a structure of a compiler for generating, from a source program, an abstract object program in the form of a sequence of abstract register machine instruction.

FIG. 2 is a diagram showing an exemplary structure of an abstract register machine compiler (generally denoted by 3100) according to the embodiment of the present invention. Referring to the figure, a source program 3102 undergoes at first a syntax analysis and a semantic analysis by a syntax/semantic analysis section 3104 of the compiler 3100 to be translated into an intermediate language program 3106, while information of a variety of symbols used in the source program 3102 is entered in a symbol table 3108. An intermediate language optimization section 3110 of the compiler 3100 performs a control flow analysis and a data flow analysis on the intermediate language program 3106 to thereby realize a global optimization, as a result of which there is generated an ArmCode program 3112 as a sequence of abstract register machine code instructions prior to an optimization processing 3114. Subsequently, the optimization processing 3114 on the ArmCode program is carried out to generate an abstract object program 3116 as the optimized ArmCode-R instruction sequence. Concerning the methods of the syntax analysis, the semantic analysis, the control flow analysis, the data flow analysis and the global optimization, reference may be made to "A. V. Aho, R. Sethi and J. D. Ullman: Compilers;Principles, Techniques and Tools", Addison-Wesley Publishing Co., 1986, pp. 1–24.

One of the aspects of the present invention can be seen in a structure of the abstract register machine code ArmCode instruction. In other words, this ArmCode instruction has a structure and contents which ape suited for the processings contemplated by the present invention, i.e., a high speed translation of the abstract object program to a machine language program suited for the target machine upon loading of the abstract object program. A system of the ArmCode instructions is common to a number of reduced instruction set computers (RISC) machines and it will hereinafter be referred to as the ArmCode-R (Abstract register machine Codes for RISC machines) system.

The ArmCode-R instructions ape suited for the computers having the features mentioned below.

(1) Operations are performed only between or among the registers.

(2) Memory access is made only with the load/store type instruction.

(3) A base register is incorporated.

(4) The number of registers which can be employed for operations are (sixteen or more).

(5) Immediate constants are available.

(6) All the instructions can each be represented by one word (32 bits).

Each of the ArmCode-R instructions is not the very machine instruction for a specific target computer but can easily be translated to the machine instruction. The representation format of each ArmCode-R instruction is characterized by the features mentioned below.

(1) The register is not represented as a physical register but as an abstract register.

(2) A memory address is specified based on not a numerical value address but a symbol name.

(3) The memory is addressed on a byte basis.

(4) The instruction is of a fixed length.

In the following description, it should be understood that The expression "ArmCode" represents "ArmCode-R" unless specified otherwise.

Figure 3:
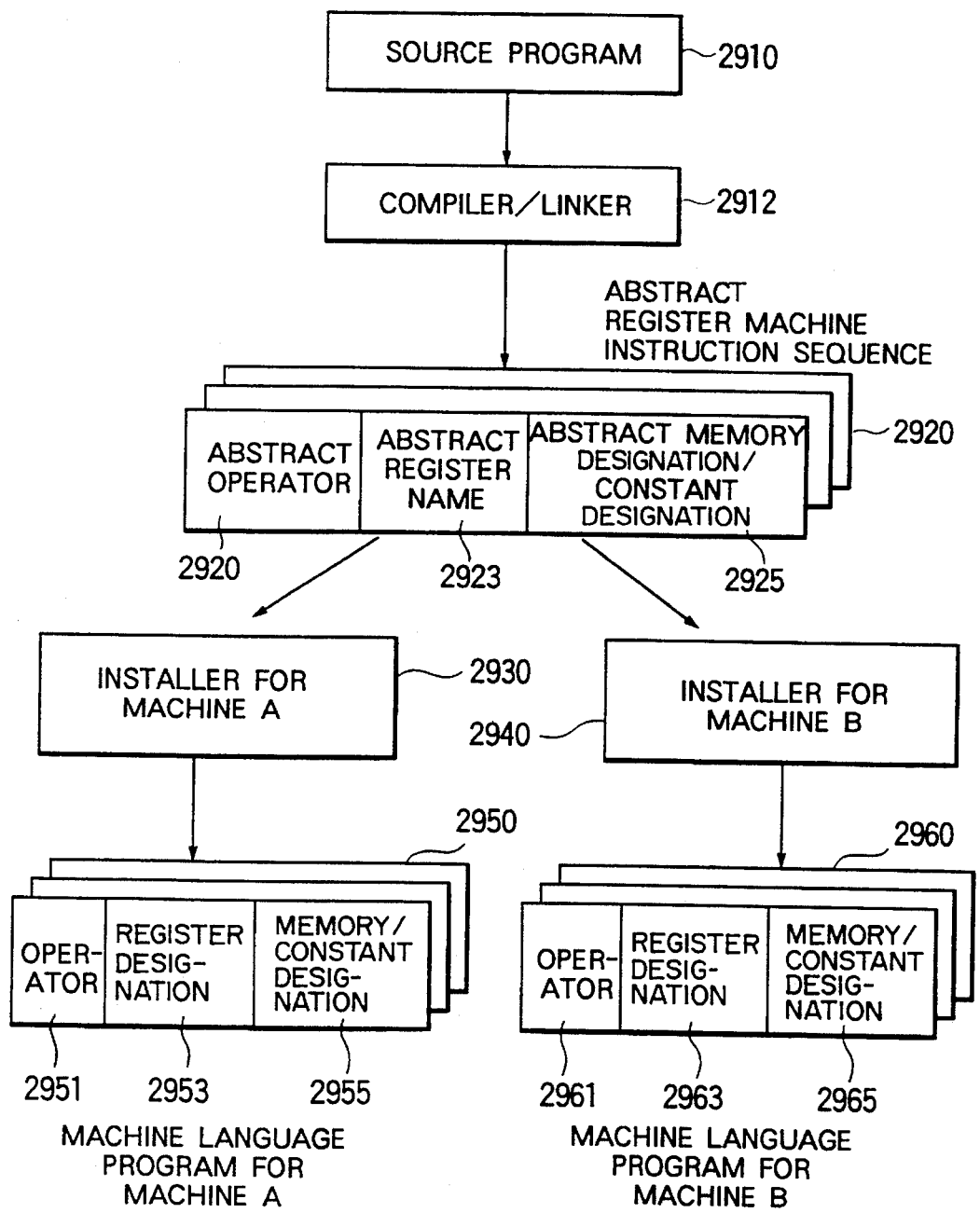
FIG. 3 is a diagram showing a relation between an abstract register machine instruction sequence and a machine language instruction sequence for a particular machine.

FIG. 3 is a diagram for illustrating correspondence relations between the ArmCode program and the machine language program for the target machine shown in FIG. 1. As mentioned previously, the source program 2910 undergoes the translation and linkage processing through a compiler/linker section 2912 to be translated into an abstract object program 2920, which is represented by an ArmCode instructions sequence composed of instructions for the abstract register machine.

Each ArmCode instruction is similar to one for a model machine or computer common to many of the currently used computers, and include an abstract operator 2921, an abstract register designation 2923 and an abstract memory/constant designation 2925 as typical or representative items. The abstract operator represents the content of one of instructions incorporated universally in many computers, such as load/store for instructing data transfers between a memory and a register, an arithmetic operation as addition or subtraction and others. The abstract register name designation indicates a register in the abstract register machine, wherein no limitation is imposed to the number of the abstract registers, differing from a case of a real computer. The abstract memory/constant designation 2925 can be handled similarly to that for a memory address and a constant in the real computer except that the former is free from any limitation in respect to the address and magnitudes of a value of the constant.

The ArmCode instruction sequence 2920 is translated into a machine language instruction sequence for a target machine through the installer provided in association with the target machine. By way of example, the instruction sequence 2920 shown in FIG. 3 is translated into a machine language instruction sequence 2950 for a machine A when an installer 2930 for the machine type A is used while it is translated into a machine language instruction sequence 2960 for a target machine B when an installer 2940 for the target machine B is used. The ArmCode instructions and real machine instructions are not always in one-to-one correspondence. In general terms, an instruction sequence including m ArmCode instructions is translated into an instruction sequence including n real machine instructions. An operator, a register designation and a memory/constant designation contained in each machine instruction are inherent to the machine to which that machine instruction is oriented. For example, an operator 2951, a register designation 2953 and a memory/constant designation 2955 of each machine instruction of the machine language program 2950 oriented for the machine A are inherent to that machine A, while an operator 2961, a register designation 2965 and a memory/constant designation 2965 of each machine instruction contained in the machine language program 2960 for the machine B are inherent to that machine B.

In the ArmCode instruction there are contained machine instruction generating instructions describing instructions which are actually to be executed by the target computer and structures thereof as well as generation control statements for controlling the generation of machine instructions, as exemplified below:

alloc(Ar10,RcArith,alc10,5,0,0,xc0000000);

if (alc10){Load RegMd Ar10 Vbase OdDisp v;}

Add RegCon Ar11 Noreg OdCi 6;

As the machine instruction generating instructions, there may be mentioned the following types, which are written in an array in the abstract object program, being punctuated by semicolons.

(1) Corresponding machine language instructions:
(Load4, Store4, Add, Sub, etc.)

(2) Pseudo-instructions representing program structures:
(Start/Pend, Block/End, Stmt, etc.)

(3) Pseudo-instructions for indicating the symbol names:
(Entry, External, Label, Name, etc.)

(4) Pseudo-instructions for designating the memory: (Dword, Dconst, Daddr, etc.)
(5) Pseudo-instructions for designating the symbol information oriented for a debugger or the like: (Sinf, etc.)

As is shown in FIG. 4, the generation control statement includes a conditional statement 3120, an assignment statement 3122 and a function reference statement 3124 and equations containing constants and simple variables can be used in the statements. As generation control functions, there can be used those functions mentioned below (refer to 3124 in FIG. 4).

(1) function: "alloc" (abstract register name, register type, discriminant variable, instruction number, preserve count, priority)

This function "alloc" serves for requesting allocation to an abstract register designated by a first parameter a physical register of the type designated by a second parameter. The instruction number is an ordinal number identifying an abstract register using instruction preceding to the allocation request. The preserve count represents the number of the registers to be preserved even after the register allocation. The priority represents the level of priority at which the register is to be allocated. The value of the discriminant variable designated by a third parameter is set to "1" when a physical register can be allocated at the time of the register allocation request while it is set to "0" when allocation of the physical register is impossible.

(2) function: free (abstract register name)

This function serves for making free (deallocating) the physical register from the abstract register designated by the first parameter.

The priority for the register allocation is represented by a bit vector. The abstract register using instructions are assigned with the sequential instruction numbers, the abstract register to be used after p instructions as counted from the current instruction is correspondingly assigned with a bit vector including one bit of "1" placed after a succession of "0s" in a number of (p−1). The priority is decided by regarding the bit vector as an unsigned integral value such that the unsigned integral value of greater magnitude represents a higher priority. Accordingly, the priority of the abstract register to be used immediately is higher than that of the abstract register used subsequently. For the abstract register to be used at a plurality of instructions, a bit vector resulting from the OR operation of those corresponding to the plural instructions is assigned. Whenever progress is made from the current instruction, the bit vector is shifted to the left by one bit. The leftmost overflowed bit occurring upon shifting to the left is discarded with the rightmost bit being supplemented with "0". Accordingly, the priority of an abstract register becomes highest immediately before the use of that abstract register and is lowered after having passed the instruction where the abstract register is used.

The bit vector representing the priority is not restricted to such structure in which the bit "1" is assigned to one instruction. By way of example, an abstract register using instruction sequence may be divided into segments each of a fixed length, and the segments are assigned with bits in one-to-one correspondence such that the bit is set to the value "1" when an abstract register of concern is used in the segment to which the abovementioned bit is assigned while otherwise being set to "0". In this manner, it is possible to express with a bit vector of a shorter length the using state of a register in the long instruction sequence. By setting the length of the segment to "1" (unity), the correspondence relation described above can be realized.

In the case of an abstract register used through or in a loop, it is assumed that the register is used again or repeatedly at an interval corresponding to a length of the loop (or one-severalth of the length of the loop), and an original bit vector is shifted to the right by an adjusted count corresponding to the loop length (or one-severalth thereof) and the shifted bit vector is arithmetically added to the original bit vector. A resulting sum is used as the bit vector representing the priority of the abovementioned register.

With the function "alloc" for allocating the physical registers to the abstract registers, the priorities mentioned above are designated. The allocation is performed when the number of physical registers capable of accommodating the abstract registers having the designated priorities are available, while otherwise the allocation is not performed. The priority allocated previously to an abstract register becomes higher as the instruction which the register is used becomes closer while the former becomes lower beyond the instruction using that register. Thus, performance of the allocation can be determined by comparing the priority of a register with the priorities of the other registers. Overflowed abstract registers not allocated with the physical registers because of their low priorities are allocated to the memory areas. Concerning the priority, description in detail will be hereinafter be made by reference to FIG. 9.

FIG. 5A is a view for illustrating a format of the ArmCode-R instruction. As can be seen in this figure, each of the ArmCode-R instructions 3130 is composed of fields of an operator 3132, an address mode 3134, a first operand 3136, a second operand 3138 and a third operand 3140, respectively, which have the contents mentioned below.

| | |
|---|---|
| Operator: | name of the ArmCode-R instruction. |
| Address mode: | discrimination of operand form. |
| 1st operand: | register R1, literal c1 or ArmCode address c1. |
| 2nd operand: | register R2, literal c2 or ArmCode address c2. |
| 3rd operand: | memory address, displacement d3, literal c3, label c3, ArmCode address c3, etc . . . |

As shown in FIG. 5B, the operands 3136, 3138 and are expressed as follows (refer to specifications of the machine language instruction generating instruction):

| | |
|---|---|
| Register: | abstract register number. |
| Memory Address: | absolute address, position of a variable name in a symbol table or abstract register number representing an address in the memory. |
| Displacement: | numerical value representing displacement relative to a base register. |
| Literal: | integer constant (numerical values, character code or positions of a character string table and a comment table to be subjected to operation). |
| Label: | item number of a label table LBL. |
| ArmCode Address: | position of instruction ArmCode |

| | |
|---|---|
| Odsym s3: | symbol table entry item s3. |
| OdLab c3: | label table (LBL) entry c3. |
| Odci c3: | intra-instruction scalar constant c3. |
| OdCL c3: | Intra-memory scalar constant indicated by c3. |
| OdCS c3: | string constant c3. |

-continued

| OdGvar s3: | temporal variable s3 generated by the compiler. |
|---|---|
| OdDisp c3: | displacement c3 |
| OdNo Null: | indication of absence of the third operand. |

The first operand 3136 indicates a store destination position of the execution result in the case of the instruction for a loading operation and computing operation while it indicates a register which holds the data to be stored in the case of the instruction for a storing operation. In the case of a conditional branch instruction, the first operand 3136 indicates a register holding target data for the condition determination. The address mode 3134 indicates the number of valid operands and the roles of them.

FIG. 6 is a view for illustrating possible combinations of the address mode 3134 with the first operand (operarid 1) 3136, the second operand (operarid 2) 3138 and the third operand (operand 3) 3140 shown in FIG. 5. It can be seen from FIG. 6 what roles the operand 1 3172, operand 2 3174 and the operand 3 3176 play for each of the address modes 3170 such as RegReg, RegMI and others. In FIG. 6, blank column indicate that the relevant operands are not valid. When the operand is a simple register, the value of the register is utilized. When the operand represents a constant, the value thereof is utilized or set. When the operand represents an address register, the content of that address register is regarded as a memory address to be accessed. In case the operand designates the base register and a displacement, a value resulting from addition Of the content of the base register and the displacement is regarded to be a memory address upon making access to that operand. In the address mode RegRCC, the constants c3 and c4 are regarded to be positive integers not greater than "255" and nested in the third operand.

FIGS. 7 to 12 are views showing specifications of the machine instruction generating instruction. Meanings of the symbols used in the specifications are as follows.

| a: | address or constant $\underline{a}$. When this value represents the address, $\underline{a}$ may be a numerical value $\underline{c}$ indicating the absolute address or a numerical value $\underline{s}$ indicating a position of the symbol table. |
|---|---|
| [a]: | content of the register or memory at the address $\underline{a}$. |
| $\hat{a}$ : | register or memory pointed by the content of the address $\underline{a}$ (having the address given by the content of $\underline{a}$). |
| (): | parenthesized expression is handled as one symbol. |
| →: | assigning to right-hand register or variable. |
| ←: | assigning to left-hand register or variable. |

In the case off the instant embodiment off the present invention, there are used the instructions mentioned below.
1) Load instructions 3210 (FIG. 7)

Load: Load one word data indicated by the operand 2 or 3 in the register indicated by the operand 1.

LoadB: Load one-byte data indicated by the operand 2 or 3 in the register indicated by the operand 1 with right justiffication.

Mode-wise processings:
RegReg: R1←[R2]
RegMI: R1←[R2^]
RegMR: R1←[([R2]+d)^]
RegMD: R1←[d]
RegCon: R1←c3
RegAdr: R1←[R2]+d 2) Store instructions 3220 (FIG. 7)

Store: Store one-word data off the operand 1 in a location indicated by the operand 2 or 3.

StoreB: Store the rightmost byte data of the operand 1 in a location indicated by the operand 2 or 3.

Mode-wise processings:
RegReg: [R1]→R2
RegMI: [R1]→R2^
RegMR: [R1]→([R2]=d)^
RegMD: [R1]→d 3) Integer-class binary floating point instructions 3230 (FIG. 7)

Add: Add the operand 2 to the operand 1, and place the result of the addition in the operand 1. Set a carry of "1" or "0" in dependence on presence or absence of overflow.

Sub: Subtract the operand 2 from the operand 1, and place the result of the subtraction in the operand 1. Set a carry to "1" when the operand 2 is greater than the operand 1 and otherwise to "0".

Mult: Multiply the operand 1 by the operand 2, and place the result of the multiplication in the operand 1.

Div: Divide the operand 1 by the operand 2, and place the quotient in the operand 1.

UnsAdd: Same as the instruction Add except for unsigned addition.

UnsSub: Same as the instruction Sub except for unsigned substruction.

AddC: Same as the instruction Add except that the carry is considered in the addition.

SubB: Same as the instruction Sub except that the borrow is considered in the subtraction.

Mode-wise processings:
ReSReS: ([R1] op [R2])→R1
RegCon: ([R1] op c3 )→R1
where "op" represents an operator.

4) Real number-class binary floating point instructions 3240 (FIG. 8)

AddR: Add the operand 2 to the operand 1, and place the result of the addition in the operand 1.

SubR: Subtract the operand 2 from the operand 1, and place the result of the subtraction in the operand 1.

MultR: Multiply the operand 1 by the operand 2, and place the result of the multiplication in the operarid 1.

DivR: Divide the operand 1 by the operarid 2, and place the quotient in the operand 1.

Mode-wise processings:
RegReg: ([RI] op [R2])→R1
RegCon: ([R1] op c3)→R1
where "op" represents an operator.

5) Binary logical instructions 3250 (FIG. 8)

And: Execute an AND operation of the operand 1 and the operarid 2 and place the result of the AND operation in the operand 1.

Or: Execute an OR operation of the operand 1 and the operand 2, and place the result of the OR operation in the operand 1.

Xor: Execute an XOR or exclusive OR operation of the operand 1 and the operand 2, and place the result of the XOR operation in the operand 1.

Mode-wise processings:
  RegReg: ([R1] op [R2])→R1
  RegCon: ([R1] op c3)→R1
    where "op" represents an operator.
6) Unitary instructions 3260 (FIG. 8)
  Negate: Invert the sign of the operand 1, and place the result off inversion in the operand 1.
  Not: Invert the bits off the operarid 1, and place result off inversion in the operand 1.
Mode-wise processing:
  Reg1: Computation is performed on the content off the operand 1, the result off which is left in the operand 1.
7) Comparison instruction 3270 (FIG. 8)
  Compar: Compare the content off the operand 1 with that off the operand 2 and set a condition code.
Mode-wise processings:
  RegReg: If [R1]>[R2] then Gt, if [R1]=[R2] then Eq, if [R1]>[R2] then Lt.
  RegCon: If [R1]>c3 then Gt, if [R1]=c3 then Eq, if [R1]<c3 then Lt.
8) Condition test instructions 3280 (FIG. 8) TZero mode Reg1: If "0", set the condition code to "Eq" and otherwise to "Ne".
  TBit mode RegCon: When the bit of [R1] at a position indicated by c3 of the third operand is "0", set the condition code to "Eq", while when it is "1", set the condition code to "Ne".
9) Conditional branch instructions 3290 (FIG. 9)
  BrEq: When the condition code is "Eq", jump to a position indicated by the operand.
  BrNe: Unless the condition code is "Eq", jump to a position indicated by the operand.
  BrGt: When the condition code is "Gt", jump to a position indicated by the operand.
  BrGe: When the condition code is "Gt" or "Eq", jump to a position indicated by the operand.
  BrLe: When the condition code is "Lt" or "Eq", jump to a position indicated by the operand.
  BrLt: When the condition code is "Lt", jump to a position indicated by the operand.
  In any of the cases mentioned above, the control is made to an immediately succeeding instruction unless the condition is met.
Mode-wise processings:
Const: Position indicated by the label table LBL[c3] is the address of the jump destination.
  RegR: [R2]+d is the address of the jump destination.
10) Unconditional branch instruction 3300 (FIG. 9)
  Jump: Jump to a position indicated by the operand.
Mode-wise processings:
  Const: Position indicated by the label table LBL[c3] is the address of the jump destination.
  RegR: [R2]+d is the address of the jump destination
11) Subprogram reference instruction 3310 (FIG. 9)
  Call: After recording a return address, jump to a subprogram indicated by the operand.
Mode-wise processings:
  RegMR: Placing the return address in R1, jump is made to the address [R2]+d.
  RegMD: Placing the return address in R1, jump is made to a subprogram address indicated by the label table LBL[c3].
  Reg1: After stacking the return address, jump to the address [R1].

12) Return instruction 3320 (FIG. 9)
  Return: Jump to the return address recorded by the instruction "Call" from the subprogram indicated by the operand.
Mode-wise processings:
  Reg1: Jump to the return address recorded in R1.
  Reg0: fetching of the return address stacked by the instruction "Call" through LIFO scheme and jump to the fetched return address.
13) Shift instructions 3330 (FIG. 10)
  These instructions are each to shift the content of the first operand R1 to the left or right by a bit number n indicated by the second or third operand.
  ShiftL: Shift R1 to the left by n bits with the rightmost n bits being "0s".
  Shift R: Shift R1 to the right by n bits with the leftmost n bits being "0s".
Mode-wise processings:
  RegCon: R1 represents a target register (i.e. register of concern) with c3 representing the bit number for the shift.
  RegReg: R1 represents a target register with [R2] representing the bit number for the shift.
14) Rotation instructions 3340 (FIG. 10)
  These instructions are each to rotate the content of the first operand R1 to the left or to the right by a number n of bits indicated by the second or third operand.
  RotL: Rotate R1 to the left by n bits.
  RotR: Rotate R1 to the right by n bits.
Mode-wise processings:
  RegCon: R1 represents a target register with c3 representing the bit number for the rotation.
  RegReg: R1 represents a target register with [R2] representing the bit number for the rotation.
15) Bit manipulation instructions 3350 (FIG. 10)
  GetBit RegCC: Place the c3-bit data starting from the bit c2 of R1 in R1 with right justification. Left-hand bit portion of R1 is "0".
  GetBit RegRCC: Place the c3-bit data starting from the bit c2 of R2 in R1 with right justification. Left-hand bit portion of R1 is "0".
  PutBit RegRCC: Place the rightmost c4-bit data of R1 in a c4-bit length field starting from the bit c3 of R2. Content of other bit field remains unchanged.
16) Data conversion instructions 3360 (FIG. 10)
  ItoR RegReg: Instruction for integer-to-real conversion of the content of R1, the result being placed in R2.
  RtoI RegReg: Instruction for real-to-integer conversion of the content of R1, the result being placed in R2.
  ItoD RegReg: Instruction for integer-to-double real conversion of the content of R1, the result being placed in R2.
  DtoI RegReg: Instruction for double real-to-integer conversion off the content of R1, the result being placed in R2.
17) Status switch instructions 3370 (FIG. 11)
  SaveSt RegMR: Save the current processor status in the memory. (saving information: program counter, status code, mask, etc.)
  LoadSt RegMR: Restore the processor status in accordance with information stored in the memory.
18) No-operation instruction 3380 (FIG. 11)
  Nop Reg0: No execution of operation with a machine instruction occupying one word.

19

19) Program structure representing pseudo-instructions 3390 (FIG. 11)

Start Cont1 OdSym: Pseudo-instruction for starting object having a name (of the symbol table) indicated by s3.

SubP Cont1 OdSym: Pseudo-instruction indicating the start of a subprogram indicated by s3.

Block Cont0: Block start pseudo-instruction.

End Cont0: Block end pseudo-instruction.

Loops Cont1 OdLab: Pseudo-instruction indicating a head of a loop statement having a label indicated by LBL (c3) as a repetition starting point.

Loope Cont1 OdLab: Pseudo-instruction indicating trail of a loop statement having a label indicated by LBL (c3) as a repetition starting point.

Pend Cont0: End of a subprogram or unit. (This "End" instruction is followed by "Define Storage" and "Define Constant" instructions and finally by "Pend" instruction.)

Stmt Cont1 OdCi: Pseudo-instruction indicating a start position of a statement having c3 as the statement number.

20) Symbol name indicating pseudo-instructions 3400 (FIG. 11)

Entry Cont1 OdSym: Pseudo-instruction indicating a name (of the symbol table) indicated by s3 as an entry name.

Extern Cont1 OdSym: Pseudo-instruction indicating that a name (of symbol table) indicated by s3 is an external name.

Label Cont1 OdLab: When c3 represents a LBL table number (user label) having a symbol table, the pseudo-instruction defining the name of the symbol table as the table name. When c3 represents a LBL table number (generated label) having no symbol table, this pseudo-instruction defining the generated label name ¥n as the label name.

Label cont1 OdCL: Pseudo-instruction defining a constant name ¥¥Cm as the label name, when c3 is LRG table number m representing a memory constant.

Label Cont1 OdGvar: Pseudo-instruction defining a generated variable name ¥¥Tk as the label name, when s3 is symbol table number k representing a generated variable.

Name Cont1 OdSym: Pseudo-instruction equating a name (of symbol table) indicated by s3 to the name of immediately preceding OpLabel.

21) Memory designating pseudo-instructions 3410 (FIG. 12)

Dconst Cont1 OdCi: Constant definition fop defining c3 as an integer constant value.

Dconst Cont1 OdCS: Constant definition fop regarding c3 as a one-word character string.

Dconst Cont1 OdCS: Constant definition for regarding c3 as a one-word character string constant.

Dword Cont1 OdCi: "Define Storage" pseudo-instruction for securing a memory area of c3 words.

Daddr Cont1 Odgym: "Define Address" pseudo-instruction for the name (of symbol table) indicated by s3.

MCode Cont1 OdCi: Pseudo-instruction for generating a machine language MaT[c3] indicated by c3.

22) Pseudo-instructions 3420 designating debugger-oriented symbol information, etc. (FIG. 12)

PInf Cont1 OdCi: Pseudo-instruction indicating information of a program characteristic information table resident at a position indicated by c3.

20

SInf Cont1 OdCi: Pseudo-instruction indicating symbol information at a position indicated by c3.

FIG. 13 is a view showing an example of the source program 3102 which is input to the compiler 3100 shown in FIG. 2. The source program 3102 is composed of a declaration statement 3610 designating a global variable, designation of a name of a function 3614, a declaration statement 3616 of local variables in the function, a sequence of executable statements beginning with an executable statement 3620, etc.. The numbers such as "1" positioned at the head of the declaration statement 3610, "10" at the head of the executable statement 3620 and the like represent the identification numbers of the respective statements. FIG. 14 to 16 show in combination an example of the ArmCode instruction sequence resulting from the translation of the source program shown in FIG. 13. The illustrated instruction sequence is not yet subjected to the optimization processing. A pseudo-instruction 3700 designating symbol information in FIG. 14 corresponds to the declaration statement 3610 in the source program shown in FIG. 13. Similarly, a pseudo-instruction 3702 corresponds to the declaration statement 3616. Further, an ArmCode instruction sequence beginning with the executable statement 3710 shown in FIG. 14 corresponds to the sequence of executable statement beginning with the statement 3620 of the source program shown in FIG. 13.

Now, the description will be made more specific concerning the priorities of the registers with reference to FIGS. 14 to FIG. 18. The instructions which use abstract registers in this ArmCode program are 3720, 3722 and so forth with an asterisk "*" at the head. The instruction "alloc" 3710 requests the allocation of a physical register to an abstract register named "Vbase" with the priority designated as "0x62489700+0x00224897". The abstract register named Vbase is used by the instructions 3722, 3734, 3758, 3770, 3790, 3828, 3846, 3850, 3856 and 3860. 32 instructions from the instruction "alloc" 3710 are checked to determine whether or not these are an abstract register using the instructions. Based on the checked result, a bit vector is generated in which "1s" are placed at the bit positions corresponding to the instructions which use the abstract register Vbase while "0s" are placed at the positions of the instructions which do not use the abstract register. As a result, the bit vector is represented by "01100010010010001001011100000000", which can be rewritten as "0x62489700" in the hexadecimal notation, as is shown in the instruction "alloc" 3710. In the case of the program shown in FIGS. 14 to 16, there exists a loop from the instruction 3868 to the instruction 3728. This loop includes 23 instructions which use the abstract register. In the case of the instant embodiment, the number of the instructions using the abstract register and contained in this loop is divided by "3", and a value associated with the quotient when the remainder is "0" or (the quotient +1) when the remainder is not zero is defined as the adjust number. The bit vector off the abstract register "Vbase" used in the loop is represented by setting the second bit to "0" in the bit vector 3910, i.e. "00100010010010001001011100000000". By shifting this bit vector to the right by a number "8" resulting from division of "23" by "3" with the remainder being rounded up, there is obtained "00000000001000100100100010010111", as shown in conjunction with the instruction 3912, which is represented by "0x00224897" in the hexadecimal notation. Accordingly, the priority of the "Vbase" allocation request is represented by a number "0x62489700+0x00224897", i.e., a sum of the addition of "0x62489700" and "0x00224897" as unsigned integers, as shown in the instruction "alloc" 3710 in FIG. 14. Through a similar procedure, the priority for the abstract register Ar5 can be computed, as is shown at 3918 and 3920 in FIG. 17.

The register allocation priority is not fixed but shifted to the left as the instructions are checked, as described previously. For example, at the position of the instruction 3732 located at the head of the loop which follows after the two register using instructions, the priorities of the registers "Vbase" and "Ar5" are shifted by two bits, respectively, resulting in that the priority of the register "Vbase" is "0x89225C00+0x0089225C", as shown at 3914 and 3916 in FIG. 17, while that of the register "Ar5" is "0x44110000+ 0x00441100", as shown at 3922 and 3924. This priority is compared with the priority "0xE0000000" of the register "Ar6" whose allocation is requested by the instruction 3732.

Figure 18:
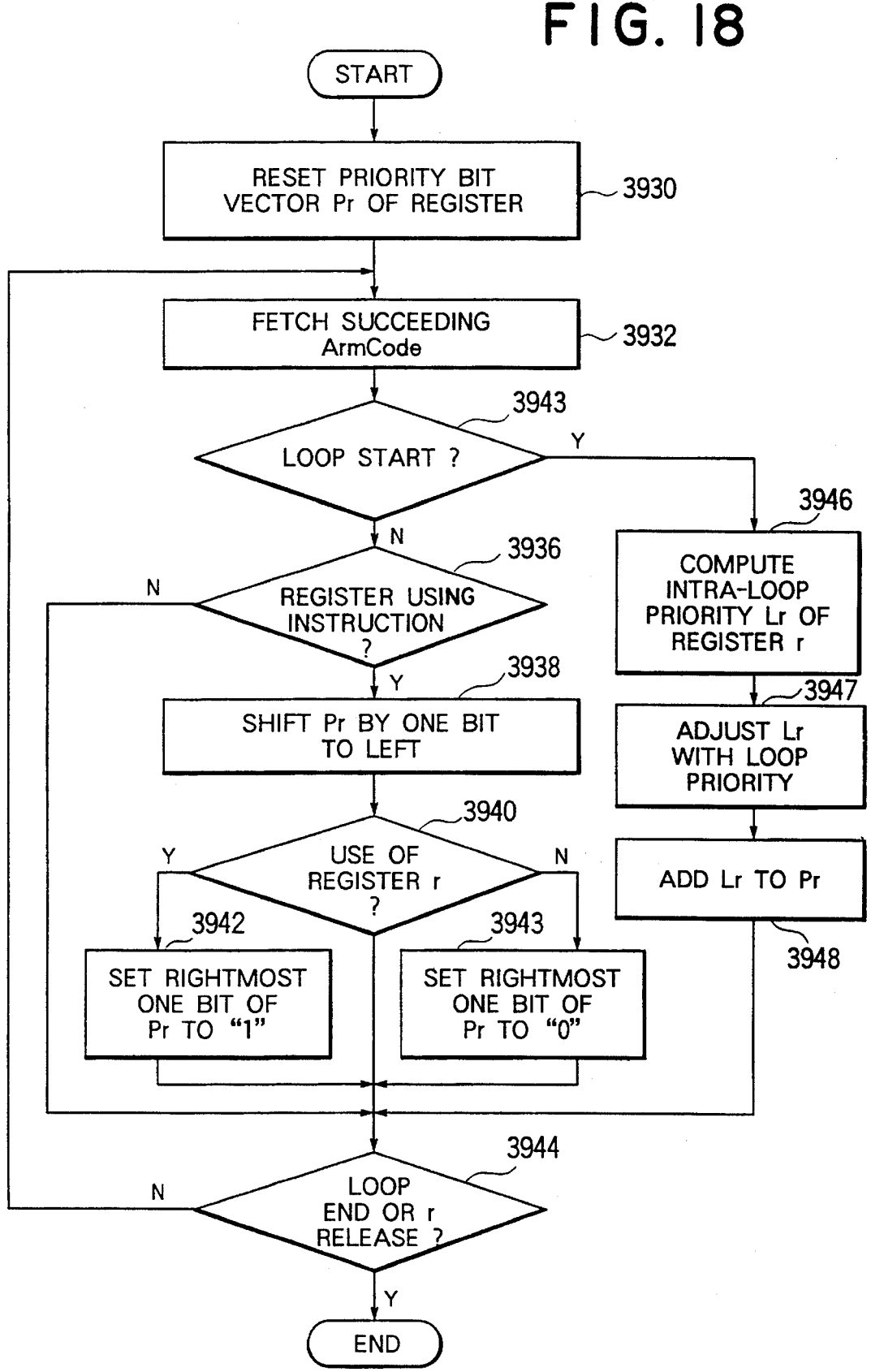
FIG. 18 is a flow chart for illustrating a procedure for generating priority bit vectors representing the priorities for the register allocation in the compiler shown in FIG. 2.

FIG. 18 is a flow chart for illustrating a procedure for generating the priority bit vector in the register allocation mentioned above. The priority bit vector of a register r is assumed to be represented by Pr. This bit vector Pr is first reset (step 3930). A succeeding ArmCode instruction is fetched (step 3932) and checked to determined whether it is the loop start instruction (step 3934). When it is not the loop start instruction, then it is checked whether the fetched ArmCode instruction is the register using instruction (step 3936). When the answer of this decision step 3936 is affirmative (Y), the priority bit vector Pr of the register r is shifted to the left by one bit (step 3938). Subsequently, it is checked whether or not the register r is used (step 3940). When the register E is used, "1" is set at the rightmost bit of the priority bit vector Pr (step 3942). If otherwise (N), the rightmost bit of the bit vector Pr is set to "0" (step 3943). When the succeeding ArmCode instruction is a loop exit instruction or an instruction to free the register r, computation of the priority bit vector for the register r comes to an end (step 3944). If otherwise, the next ArmCode instruction is fetched, and the processing described above is repeated.

When the ArmCode instruction as fetched in the step 3932 is determined to be the loop start instruction (step 3934), the priority bit vector of the register r is assumed to be represented by Lr within the loop under consideration and determined through the same procedure as described above (steps 3930 to 3944). Subsequently, the number of the abstract register using instructions contained in the loop is divided by three with the remainder. If there is any remainder, the quotient is rounded up. Then, the priority bit vector Lr is adjusted by shifting it to the right by a number of bits corresponding to the quotient or the rounded up quotient resulting from the above determination (step 3947). Thereafter, the adjusted priority bit vector Lr is added to the priority bit vector Pr of the instruction sequence including the loop (step 3948). In this way, the allocation priority bit vector Pr for one abstract register r can be computed. This processing is executed for each of the abstract registers.

Figure 19:
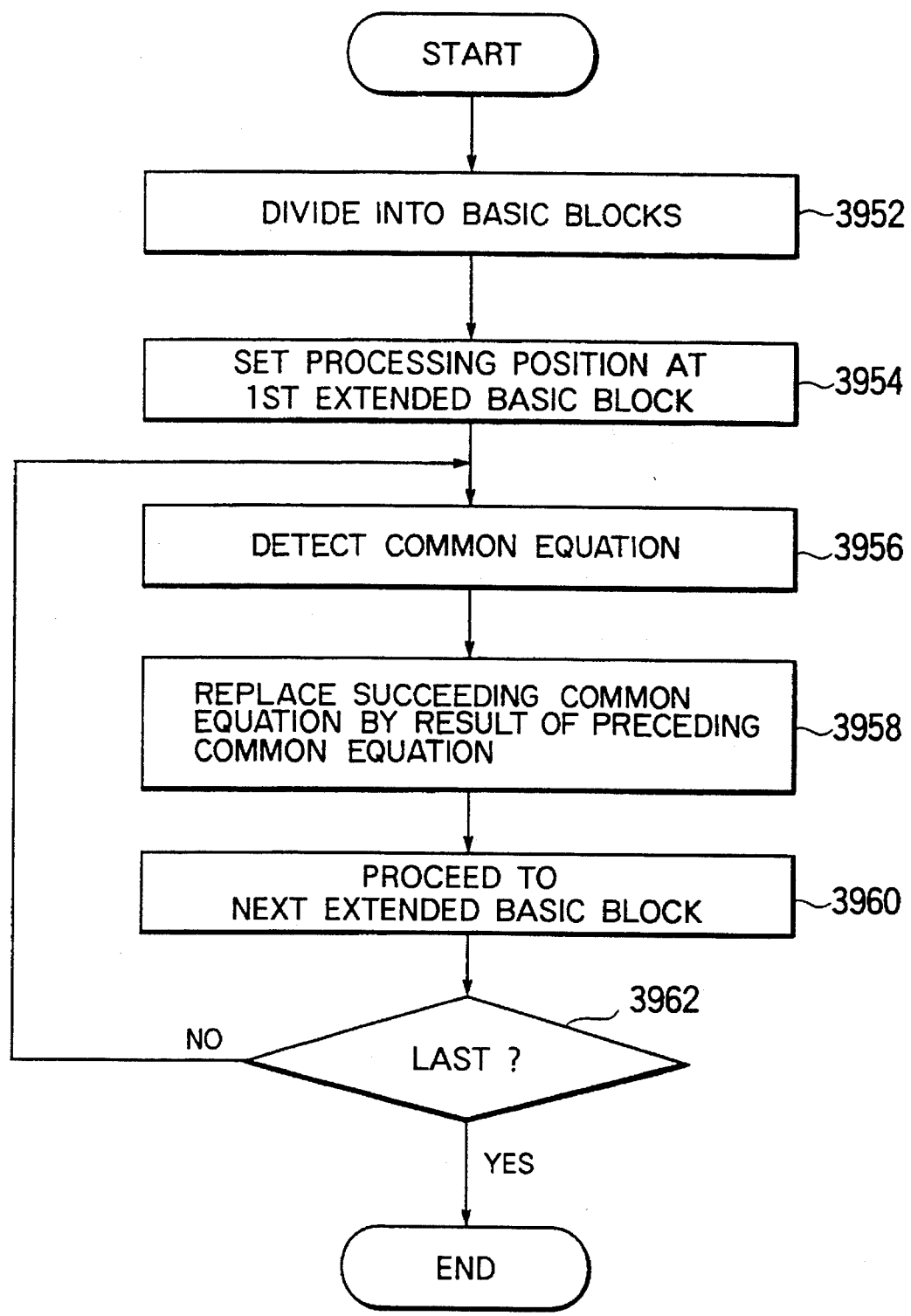
FIG. 19 is a flow chart for illustrating a process of eliminating a common expression as executed as a part of optimization processing by the compiler shown in FIG. 2.

FIG. 19 is a flow chart illustrating a procedure of the object optimization for enhancing the efficiency of execution of a machine language program obtained from an ArmCode program according to an embodiment of the present invention. At first, an ArmCode instruction sequence of the ArmCode program is divided into a plurality of basic blocks by punctuating the sequence at flow-in points and branching points of the control (step 3952). Each of the basic blocks has a feature that it is executed in a beeline from the start to last instructions. In the case of the example illustrated in FIGS. 14 to 16, the instructions 3712 to 3722, 3724 to 3748, 3750 to 3778 etc. constitute the basic blocks, respectively, and a generation control instruction "bblock" indicating the inter-block link relation is added at the head. In the case where a certain basic block b is necessarily executed immediately after the execution of other basic block a, a basic block sequence which allows execution of the block b in succession to the basic block a to which the block b is linked is referred to as the extended basic block. By way of example, for the basic blocks starting from the instructions 3724, 3750 and 3780, respectively, a resultant block obtained by linking together these three basic blocks represents an extended basic block, because in each of the abovementioned basic blocks, the succeeding instruction is neccessarily executed immediately after the preceding instruction. The basic block beginning with the instruction 3840, for example, where extension is impossible because the preceding basic block and the succeeding basic block can not definitely be established, is defined by itself as one extended basic block. Subsequently, a common expression or equation in the extended basic block is deleted. To this end, starting from the first extended basic block (step 3954), the common equation in the extended basic blocks is picked out (step 3956). The succeeding common equation is replaced by the content of a register or a variable representing the result of the common equation picked out precedingly (step 3958). This procedure is repeated until the last extended basic block has been reached (steps 3960, 3962). The abovementioned processing can be carried out by applying the algorithm disclosed in the Aho, Sethi and Ullman mentioned hereinbefore to the ArmCode instruction sequence.

FIGS. 20 to 21 are views showing in combination an ArmCode instruction sequence generated as the result of the above-mentioned processing of the instruction sequence shown in FIG. 14 to 16 and the optimization processing described below. Referring to FIGS. 20 and 21 together with FIGS. 14 to 16, the optimization processing will now be described more specifically. In FIGS. 14 to 16, the computation instructions 3758 and 3760 for computing the value of the abstract register Ar8, the computation instructions 3790 and 3792 for computing the value of the abstract register Ar12 and the computation instructions 3828 and 3830 for computing the value of abstract register Ar15 are same as the computation instructions 3734 and 3736 for determining the value of the abstract register Ar6, while the instruction 3764 for determining the value of the abstract register Ar9 is same as the instruction 3740 for determining the value of the abstract register Ar7. Similarly, the instruction for determining the register value Ar13 is same as that for the register value Ar11, while the instructions for determining the register values Ar15 and Ar16 are same as that for determining the value of Ar5. Consequently, in the instruction 4098, the abstract registers Ar6 and Ar11 are reused, while in the instruction 4076, the register Ar7 is reused with the register Ar5 being reused in the instructions 4108, 4110 and 4112, as shown in FIGS. 20 and 21. In this manner, these abstract registers are replaced by those having the identical values, respectively, whereby the instructions for determining the values of the abstract registers Ar8, Ar12, Ar15, Ar9, Ar13, Ar15 and Ar16 are deleted. Since the use frequencies of the abstract registers as well as the positions at which they are used change in accompanying the replacements mentioned above, the order of the priorities allocated to these abstract registers will vary correspondingly. The instructions "alloc" 4028 etc. shown in FIGS. 20 and 21 indicate the processings mentioned above.

Figures 22, 23:
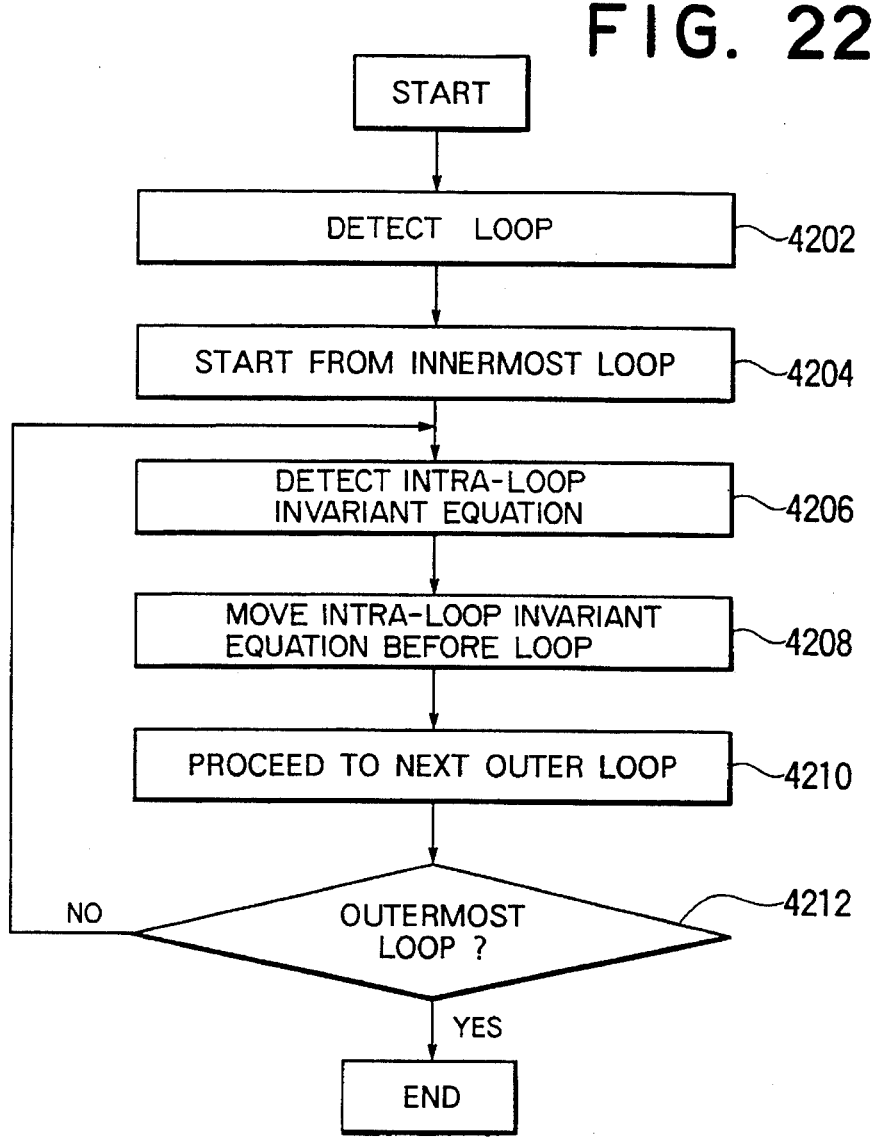
FIG. 22 is a flow chart illustrating a processing for effectuating movement of intra-loop invariants.
FIG. 23 is a view showing usages of physical registers in a target machine A.

An ArmCode program shown in FIGS. 20 and 21 is derived from the ArmCode program shown in FIGS. 14 to 16 by moving the intra-loop invariant equation outside of the loop and by effecting a branch optimization. FIG. 22 is a flow chart for illustrating the processing to this end. More specifically, referring to the figure, the loops are detected by a flow analysis (step 4202). Thereafter, starting from the innermost loop (step 4204), the intra-loop invariant equations are detected (step 4206) to be subsequently moved to the position immediately before the start of the loop (step 4208), evading repetition of the same computation within the loop. This processing is repeatedly executed up to the outermost loop inclusive (steps 4210, 4212). Since the values of the abstract registers Ar10, Ar11 and Ar17 shown in FIGS. 14 to 16 remain invariable in the loop which starts from the instruction 3728 and ending at the instruction 3874, the instructions 3770, 3786 and 3860 for computing the values of these registers are moved to the position before the loop. The instructions moved in this way are indicated at 4038, 4044 and 4050, respectively, in FIGS. 20 and 21.

Further, referring to FIGS. 14 to 16, the branch destination L3 (3806) of the conditional branch instruction BrGe (3778) includes an unconditional branch instruction (3808) to L5. Accordingly, by determining the branch destination of the conditional branch instruction (3778) as L5, the unconditional branch instruction (3808) at L3 can be deleted. Additionally, the jump destination L4 (3812) of the unconditional branch instruction "Jump" (3802) includes the unconditional branch instruction (3814) to L5. Accordingly, by determining the branch destination of this instruction "Jump" as L5, the unconditional branch instruction (3814) at L4 can be deleted as well. As the result of the processings for enhancing the ArmCode instruction sequence execution efficiency for the abstract register machine as described above, there is obtained the ArmCode program shown in FIGS. 20 and 21.

Next, description will be turned to a method of generating a machine instruction train for a real machine from an ArmCode instruction sequence i.e., ArmCode-R program generated in the manner described above.

FIG. 23 is a view showing the types of the physical registers used in a machine A. More specifically, it is shown at 4260 that 8th to 23rd physical registers can be used for arithmetic operations "RcArith". Similarly, a "RcAddr" shown at 4262 indicates a register usable for address calculation, "RcSect" at 4264 indicates a register used for indicating a section start position. Further, "RcReturn" at 4266 indicates a register used for restoration from a subprogram, "RcFuncval" at 4268 indicates a register used for placing therein a function value, "RcParm" at 4270 indicates a register used for placing therein a parameter, "RcNosave" at 4272 indicates a register which is neither saved nor restored upon reference to a subprogram, "RcTemp" at 4274 indicates a register which is used temporally, "Rcfixed" at 4276 indicates a register having the usage fixed, and "RcAny" at 4278 represents all the registers which are subject to the register allocation.

Figure 24:
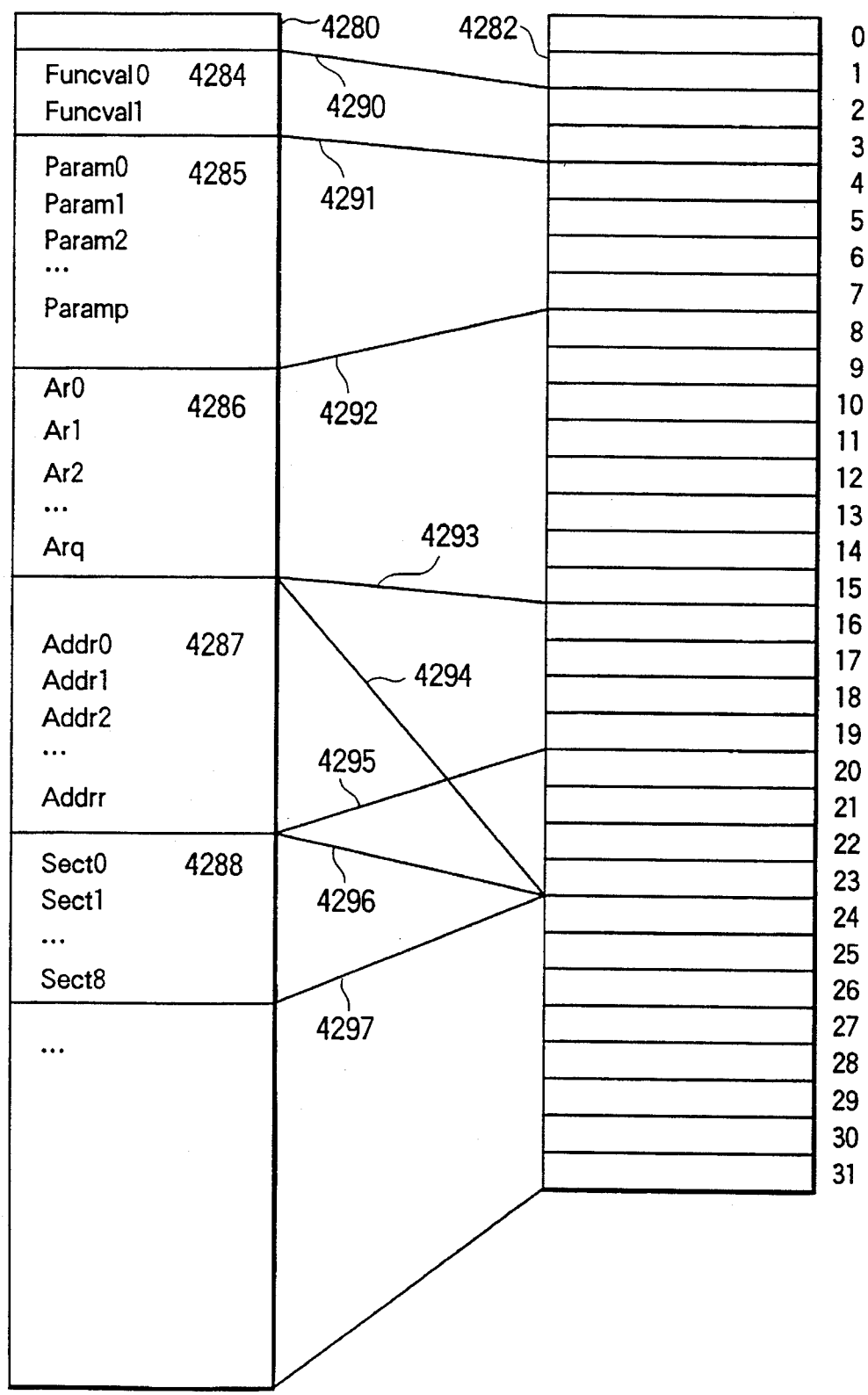
FIG. 24 is a view for illustrating correspondence relations between the physical registers and the abstract registers.

FIG. 24 is a view for illustrating a part of correspondence relations between the physical registers of the machine A and the abstract registers. It is assumed that the number of the abstract registers 4280 is arbitrary while the number of the physical registers 4282 of the machine A is limited to "32". As can be seen in FIG. 24, there are established correspondences between the abstract registers (4284) "Funcval0" and "Funcval1" for placing therein function values and the physical registers "2" and "3", as indicated by 4290 and 4291. Similarly, correspondences are established between the abstract registers (8285) "Param0", "Param1", . . . , "Paramp" for placing parameters therein and the physical registers "4" to "7", as indicated at 4291 and 4292, between the abstract registers for arithmetic operations (4286) "Ar0", "Ar1", . . . , "Arq" and the physical registers "8" to "23", as indicated by 4292 and 4294, between the abstract registers (4287)"Addr0", "Addr1", . . . , "Addrr" for the address calculation and the physical registers "16" to "23", as indicated by 4293 and 4296, and between the abstract registers (4288) "Sect0", "Sect1", . . . , "Sects" for indicating the section start positions and the physical registers "20" to "23", as indicated by 4295 and 4297, respectively. At this juncture, it should be noted that the number (p+1) of the abstract registers for parameters, the number (q+1) of the abstract registers for arithmetics operations, etc. are not restricted to the number of the physical registers but depend on the numbers of those registers which are required by the source program. As to the manner in which the abstract registers are allocated to the physical registers of the target machine, description will be made later on by reference to FIGS. 26 to 29.

Figure 25:
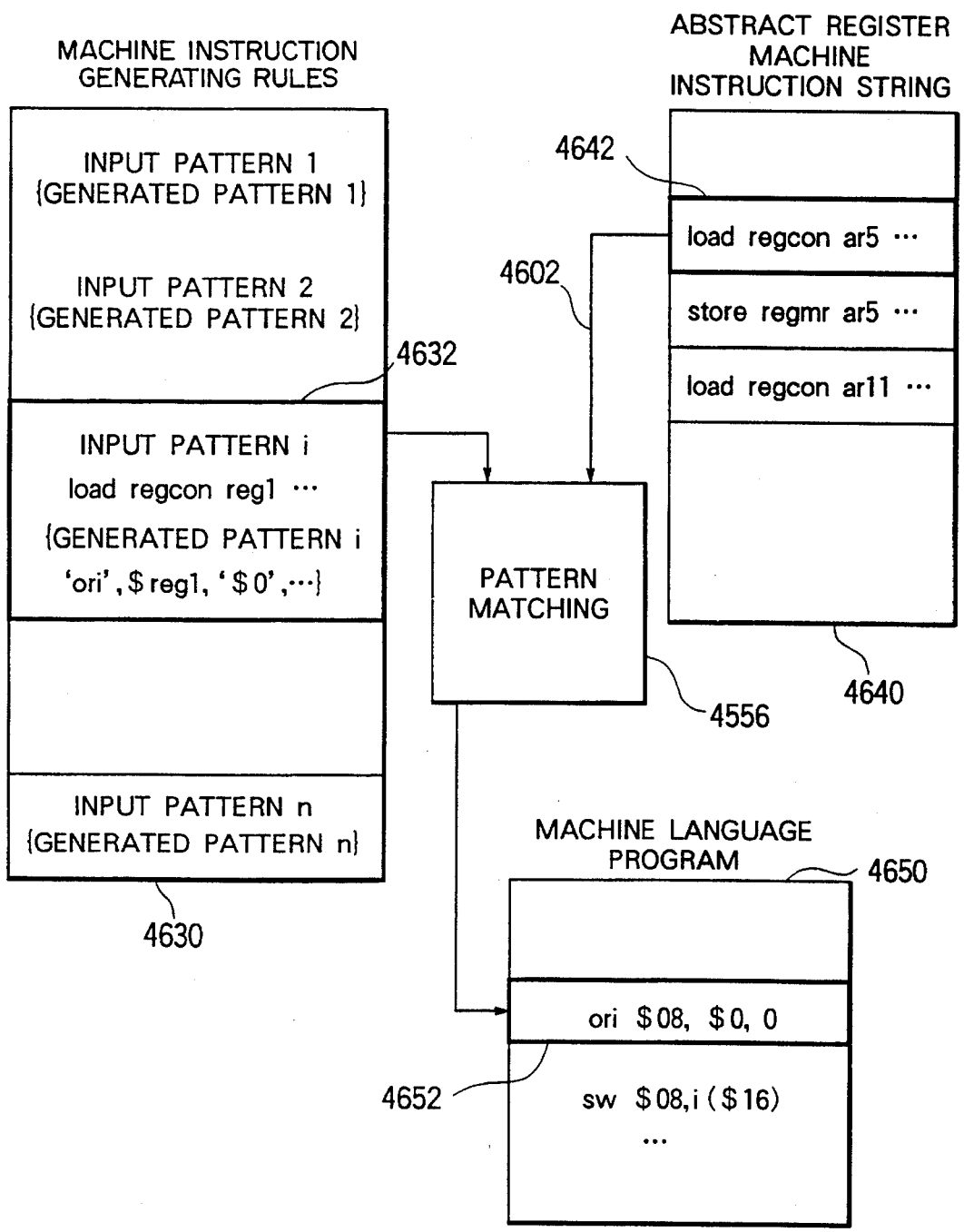
FIG. 25 is a flow chart for illustrating a translation into a machine language with the aid of pattern matching technique.

FIG. 25 is a diagram for illustrating a system for realizing the machine language generation through a pattern matching procedure. The illustrated system includes a pattern matching section 4556 and a table 4630 of machine instruction generating rules and operates to generate a machine language program 4650 in response to an ArmCode instruction sequence 4640 of an ArmCode program as input. The table 4630 stores input patterns and corresponding output patterns in one-to-one correspondence. Assuming now that one instruction 4602 is fetched from the instruction sequence 4640 an input pattern which coincides with the one instruction 4602 is searched for in the table 463. In the case of the illustrated example, it is assumed that the instruction 4602 coincides with the input pattern i of the i-th generating rule 4632. Accordingly, a machine instruction 4652 is generated from the input instruction 4602 in accordance with the generation pattern i of the i-th generating rule 4632. At this time, processing such as replacement of the abstract register by the physical register, modification of the generating rule in consideration of the environmental conditions or the like is performed, as will be described hereinafter by reference to FIGS. 29 to 35.

FIG. 26 is a view showing a part of the machine instruction generating rules oriented for the machine A. As will be seen in the figure, the generating rules are parenthesized by brackets "{ }" after a corresponding ArmCode instruction sequence as shown at 4300, 4312 and others. Generation of the corresponding machine instructions is same as in C language. A symbol "|" affixed at the head as shown at 4312, 4316 and others represents alternative between the sequences. The operands Regl, C, V, and others for the abstract register machine are expressed by $Regl, $C, $V and the like in the braces "{ }".

Specifically, manners of generating a machine instruction for the machine A in correspondence to an abstract register machine instruction indicated at the first row 4300 for loading a constant are shown as rows of statements parenthesized by the braces "{ }", starting from the row 4302. More specifically, the parenthetical statements describe that if the constant is "00" (zero) or greater than "0" and smaller than "65536", a machine instruction is to be generated in accordance with the statement 4304 and if otherwise the machine instructions are to be generated in accordance with the statements 4308 and 4310. FIG. 28 shows a machine instruction 4500 which has been generated by applying this rule to the instruction 4030 shown in FIG. 2. In this example, the abstract registers are allocated with the physical registers in correspondence to the types of the abstract registers, as exemplified by allocation of the physical register $08 to the abstract register ArS, the physical register $17 to the abstract register Ar6 and so Forth, as shown in FIG. 27 at 4440.

Unless the number of the physical registers as requested are available, the allocation of the physical registers is not performed in response to the request by the instruction "alloc" but the physical register allocation processing is again executed at the time when the physical registers are actually used. By way of example, the instruction 4046 shown in FIG. 20 indicates a physical register allocation request for the abstract register Ar17. However, this instruction contains a designation that the number of the physical registers to be preserved even after the allocation is "2". Besides, the priority of this instruction 4046 is relatively low. Accordingly, it may occur that no physical register allocation is effected at this time point. In this case, the condition 4048 is not fulfilled. Accordingly, though no load instruction is generated in response to the instruction 4050, only the fact that the abstract register Ar17 represents the value of a variable n is recorded. Consequently, the comparison instruction 4112 which uses the abstract register Ar17 is not yet allocated with any physical register. Thus, the physical register allocation processing is again executed upon processing this ArmCode instruction. At this time, the abstract register Ar17 has the highest priority to allow the allocation to be executed, whereby the load instruction for setting the value of the register Ar17 is also generated. Assuming in conjunction with this example that the abstract register Ar17 is allocated with the physical register the instruction for loading the value of the variable n is generated in accordance with the record made at 4046. As a result of this, there are generated in place of the instruction 4526 in FIG. 28

"sub $24, $08, $12"

two instructions:

"lw $09, n($16)", and

"sub $24, $08, $09".

In this way, if the abstract register allocated with no physical register is to be used, allocation of the physical register as well as setting a value there in is performed by using a function "gen" contained in the machine instruction generating rules shown in FIG. 26 such as the rule 4304 and others.

The installer for the machine A generates the machine language program for the machine A from the abstract object program in the manner described above. At that time, selection of the optimal machine instruction sequence and the optimal utilization of the physical registers are attempted in conformance with the target machine. In the case of the illustrated example, such measures are adopted that the machine instruction sequence to be generated is changed in conformance with the magnitude of a constant in accordance with the generating rule 4302 shown in FIG. 26 and that correspondences to the abstract registers are established by taking into account the number and the types of the usable physical registers, thereby allowing the physical registers such as $11 placed with a value to be used as many times as possible. In case there appears common equations in the generated machine language program in accompanying the expressions inherent to the target machine, the optimization processing such as deletion of repetitive computation for the common equation may be performed by resorting to the processing described hereinbefore in conjunction with FIG. 19.

Figure 29:
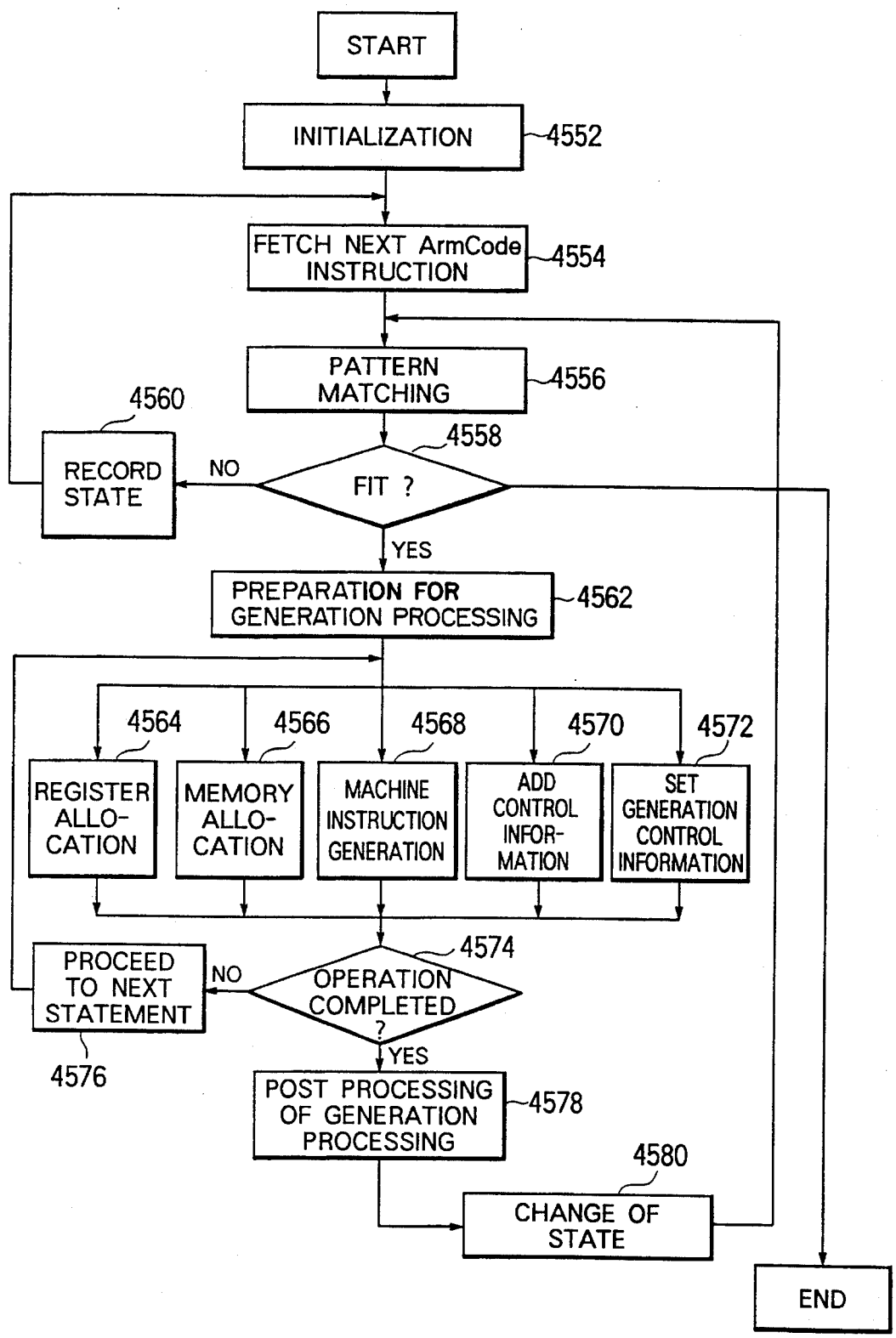
FIG. 29 is a flow chart for illustrating processings performed internally of the installer.

FIG. 29 is a flow chart for illustrating a processing flow of generation of the machine language program. After initialization (step 4552), one of the ArmCode instructions which constitutes a part of the abstract object program is fetched (step 4554), and the pattern matching is performed for checking to which of the patterns corresponding to the ArmCode instructions described in the machine instruction generating rules such as shown in FIG. 26 the fetched ArmCode instruction fits (step 4556). In case no fitting pattern is found, the matching resultant state is recorded (step 4560), and then the succeeding ArmCode instruction is fetched. When the fitting pattern is found, preparation for a machine instruction is made in accordance with description of the machine language generation for the Fitting pattern (step 4562). When the register allocation is requested for the generated machine instructions as described, the register allocation processing is performed (step 4564). When the memory allocation is requested, the memory allocation processing is executed (step 4566). For the request for generation of a real machine instruction, the corresponding processing is performed (step 4568). When addition of control information such as the debugging control information and others is requested, the control information as required is added to the machine language program (step 4570). In case the generation control information concerning the register allocation, memory allocation, selection of the instructions to be generated and/or the like is requested, the corresponding information setting processing is executed (step 4572). Subsequently, processing procedure proceeds to a next statement contained in the description of the machine language generation (step 4576). Execution of the above-mentioned processing steps 4566 to 4576 is repeated. When the operation(s) designated in the description of the machine language generation has been completed (step 4574), post-processing for the generation processing for the pattern of concern is performed (step 4578). At this time, the matching state is altered so as to conform with the current state (step 4580), and return is made to the pattern matching processing. When it is detected that the abstract object program has been entirely, the machine language generation processing comes to an end (step 4582).

Figure 30:
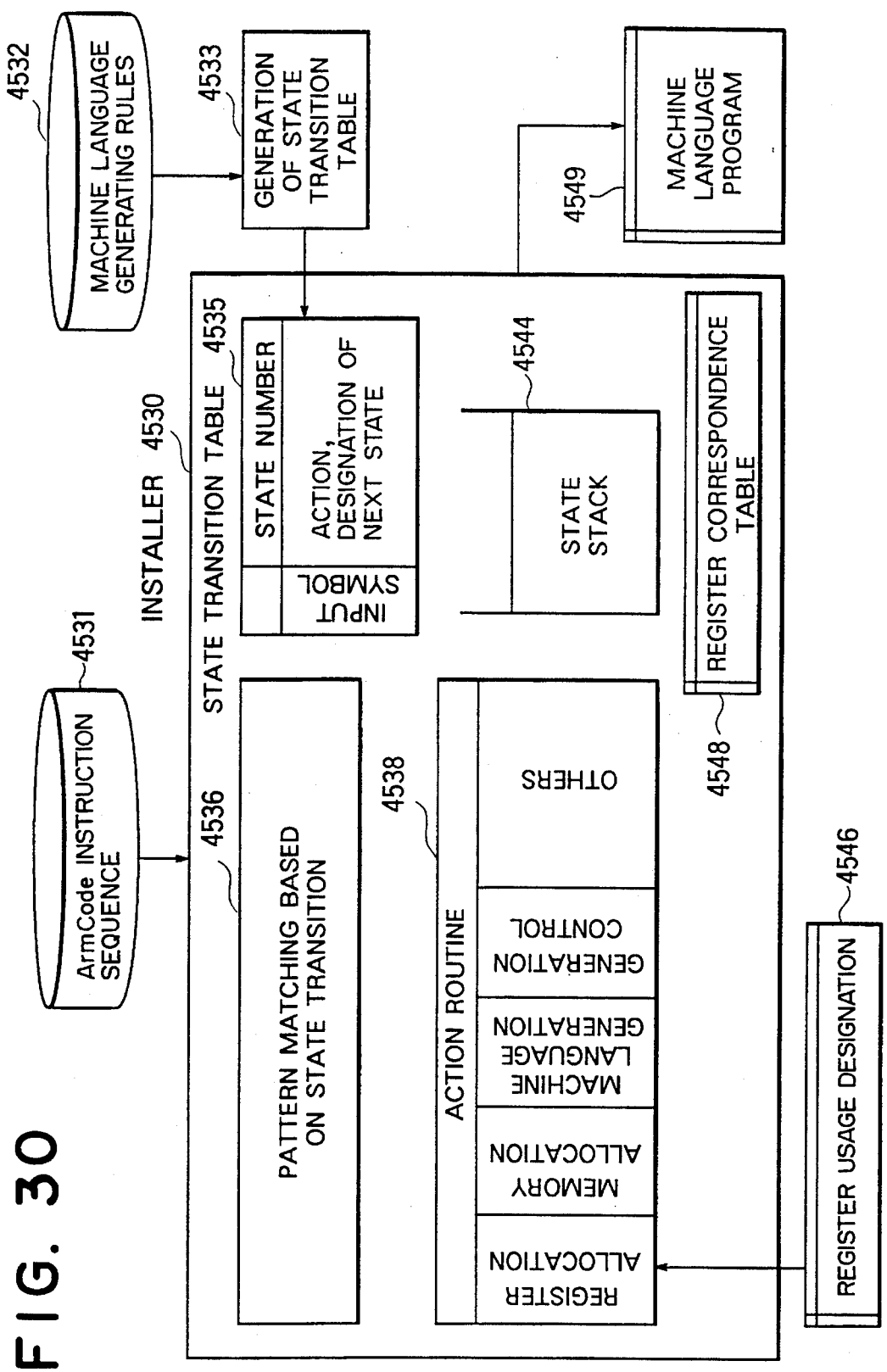
FIG. 30 is a schematic block diagram showing a structure of the installer together with inputs and an output thereof.

FIG. 30 is a schematic block diagram showing an internal structure of the installer for generating the machine language program from the ArmCode program in the manner described above. Referring to the figure, the installer 4530 generates the machine language program 4549 from the ArmCode instruction sequence 4531 and the machine instruction generating rules 4532 for the target machine of concern. The pattern matching is principally effectuated by making use of a state transition table. To this end, the generating rules 4532 are transformed into a state transition table 4535 by a state transition table generation program 4533. The state transition table 4535 contains actions to be executed and the ID number of the next state to which the transition is to be made for each combination of the individual ArmCode instructions as input and the state ID numbers. In the pattern matching based on the state transition, a suitable one of action routines 4538 is selected for execution by reference to the state transition table in dependence on the ArmCode instruction as inputted and the current sate. A state stack 4544 serves for recording the state transition history. On the other hand, a register usage designation table 4546 contains records concerning the register usage designations intrinsic to the target machine, while a register correspondence table 4548 is used for recording correspondence relations between the abstract registers in the program being processed and the physical registers.

FIG. 31 is a view showing types of the physical registers in a machine B which differs from the machine A in respect to the instruction scheme. As shown in this figure at 4600, 1st to 7th and 16th to 23rd physical registers of the machine B can be used for the arithmetic operations as represented by "RcArith". Similarly, there are represented by "RcAddr" at 4602 the physical register which can be used for the address calculation, while "RcTemp" at 4614 represents the physical register used temporally. In this manner, there are indicated in FIG. 31 the usages of the physical registers in the machine B which differ from those of the machine A shown in FIG. 23.

Figure 32:
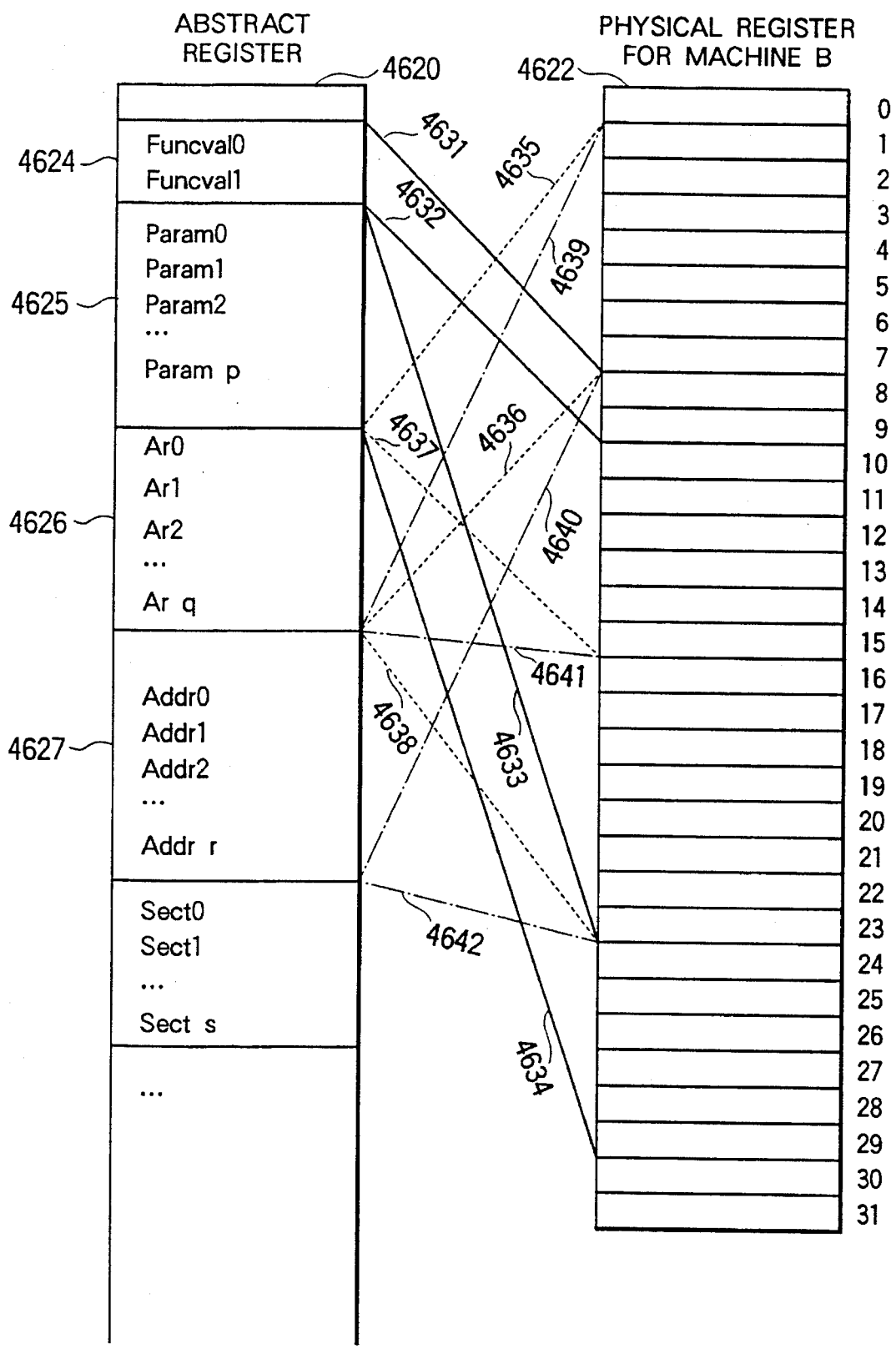
FIG. 32 is a view showing a state in which the physical registers of the machine B are allocated to the abstract object program shown in FIGS. 20 and 21.

FIG. 32 is a view showing a part of correspondence relations between the physical registers incorporated in the machine B and the abstract registers. Although the abstract registers 4620 may be used in an arbitrary number as in the case of the machine A, the number of the physical register of the machine B is limited up to thirty-two. The abstract registers 4624 for placing function values therein are represented by "Funcval0" and "Funcval1" and correspondences are established to the physical register "8" and "9", respectively, as indicated by 4631 and 4632. Representing the abstract registers 4625 used for placing parameters therein by "Param0", "Param1", . . . , "Pramp", there are established correspondence relations between these abstract registers and the physical registers "24" to "29" as indicated by 4633 and 4634. The abstract registers 4626 used for arithmetic operation and represented by "Rr0", "Ar1", . . . , "Arq" bear correspondence relations to the physical registers "1" to "7" and "16" to "23", as indicated by 4635, 4636, 3637 and 4638, respectively. Similarly, the abstract registers 4627 used for the address calculation and represented by "Addr0", "Addr1", . . . , "Addrr", respectively, bear correspondence relations to the physical registers "1" to "7" and "16" to "23", as indicated by 4639, 4640, 4641 and 4642, respectively.

FIG. 33 is a view showing a part of the machine instruction generating rules oriented for the machine B. By way of example, the rule 4700 dictates how to generate the machine instruction in correspondence to the ArmCode instruction for the constant loading. The rule 4712 is for the machine instruction concerning the loading from a memory. The rule 4716 indicates how to generate machine instructions for the ArmCode instruction sequence which dictates that the result obtained from the addition of registers Reg1 and Reg2 be placed in the register Reg3. In this way, FIG. 32 shows the machine instruction generating rules which are required for translating the abstract object program shown in FIGS. 20 and 21 into a machine language program. FIG. 34 is a view showing the correspondence relations of the physical registers incorporated in the machine B to the abstract registers in the program shown in FIGS. 20 and 21, as exemplified at 478. More specifically, there are shown in this Figure the results of the register allocation by the generation control instructions such as "alloc", "free", etc..

FIG. 35 is a view showing examples of the machine instructions generated by applying the rules shown in FIG. 33 to the ArmCode instructions shown in FIGS. 20 and 21. More specifically, referring to FIG. 35, a machine instruction 4800 is generated by applying the rule 4700 shown in FIG. 33 to the ArmCode instruction 4030 shown in FIG. 20, and a machine instruction 4802 is generated by applying the rule 4722 to the ArmCode instruction 4032. In this manner, the installer for the machine B applies the rules shown in FIGS. 20 and 21 to thereby generate the machine language program for the machine B as shown in FIG. 35.

As will now be understood from the above description, the installer for the machine A generates the machine language program for the machine A with the installer for the machine B generating the machine language program for the machine B, both from one and the same abstract object program. These two installers differ from each other with regard to the applicable machine instruction generating rules and the physical register usage designations. However, both installers are the same with respect to the contents of the processing illustrated in FIG. 29.

As will be appreciated from the foregoing description, according to the instant embodiment of the invention, a major proportion of the global optimization processing and the register allocation optimization processing are carried out by the compiler which is independent of the target machines, wherein the information concerning the flow analysis, register allocation and others generated by the compiler is transferred to the installer, as a result of which the installer can generate the machine language program of improved execution performance or efficiency without need for complicated processing. Accordingly, even when the target-oriented machine language program is generated from the machine-independent abstract object program by the installer(s) every time the program is activated, there arises substantially no problem concerning the execution performance and the processing time taken by the installer.

Further, according to the instant embodiment, software can be delivered to a plurality of different target machines in the form of the same abstract object program without involving the necessity of adjusting the software or re-compilation for each of the target machines, whereby maintenance and management can be significantly facilitated.

Moreover, it is noted that according to the instant embodiment of the invention, the abstract object program is decomposed to very fine levels of manipulation when compared with the source program. Besides, the abstract object program differs from the source program with regard to the structure as well as sequence of the descriptions. For these reasons, it is practically impossible to restore the source program from the abstract object program. Thus, by delivering a software in the form of the abstract object program to the users, it is possible for the user to execute one and the same program by a plurality of computers or machines and/or change the types of machines as used while maintaining in secrecy the software implementation schemes and algorithms contained in the source program.

It should be further noted that by using the installer according to the present invention, one and the same source-level debug system can be made use of by a plurality of machines. An embodiment directed to this feature of the invention will be described below by referring to FIGS. 36 to 45.

Figure 36:
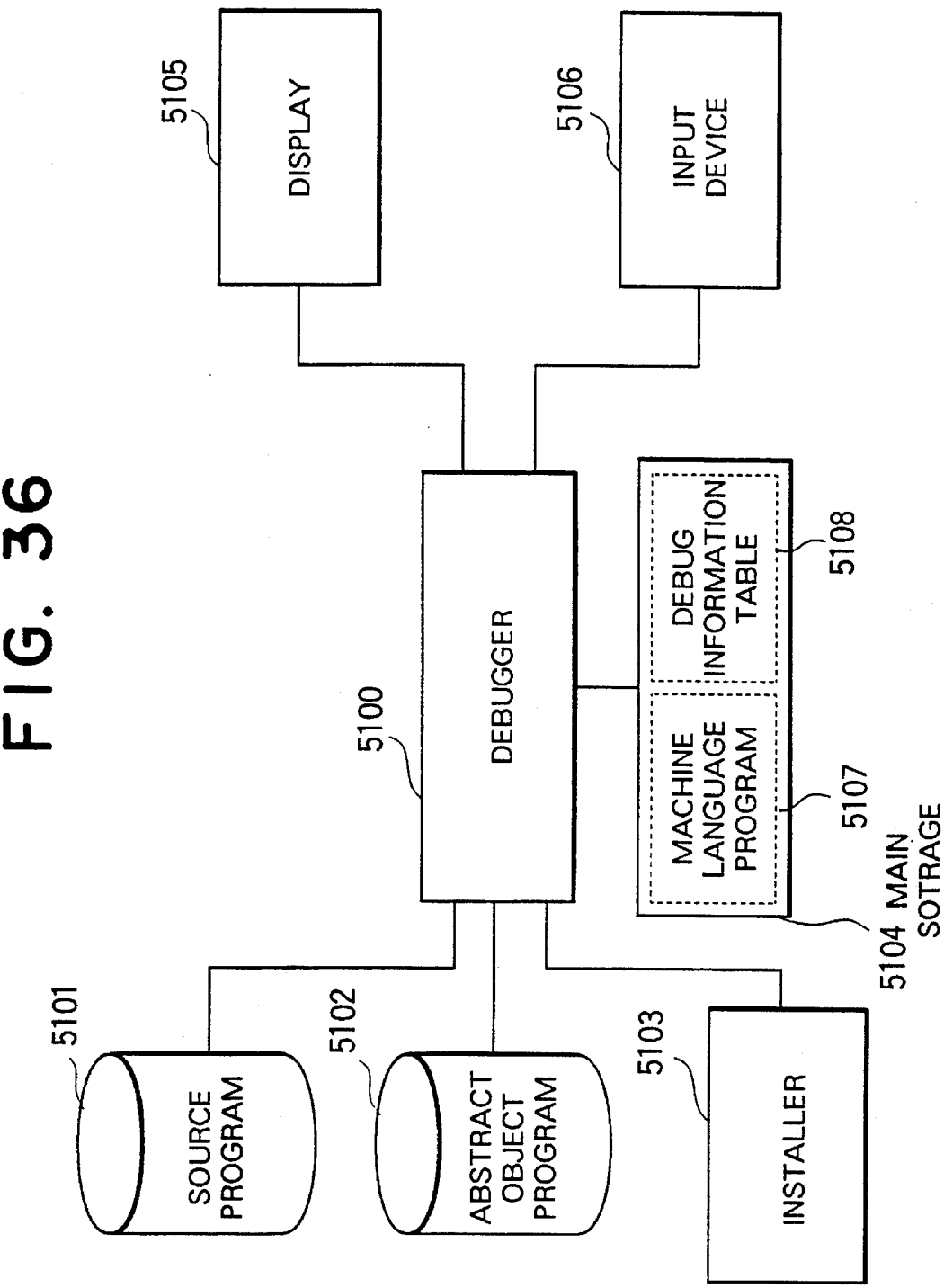
FIG. 36 is a block diagram showing a structure of a debugging system to which the installer according to an embodiment of the invention is applied.

FIG. 36 is a block diagram showing a structure of a debug system to which the installer according to the invention is applied. Referring to the figure, a debugger 5100 is used for debugging an abstract object program 5102 generated by compiling a source program 5101. An installer 5103 implemented according to the teachings of the invention is used for translating the abstract object program into a machine language program 5107. A main memory 5104 is employed for storing the machine language program 5107 and a debug information table 5108. A display unit 5105 serves for displaying the results to the user while an input device 5106 is used for receiving the inputs from the user.

Figure 37:
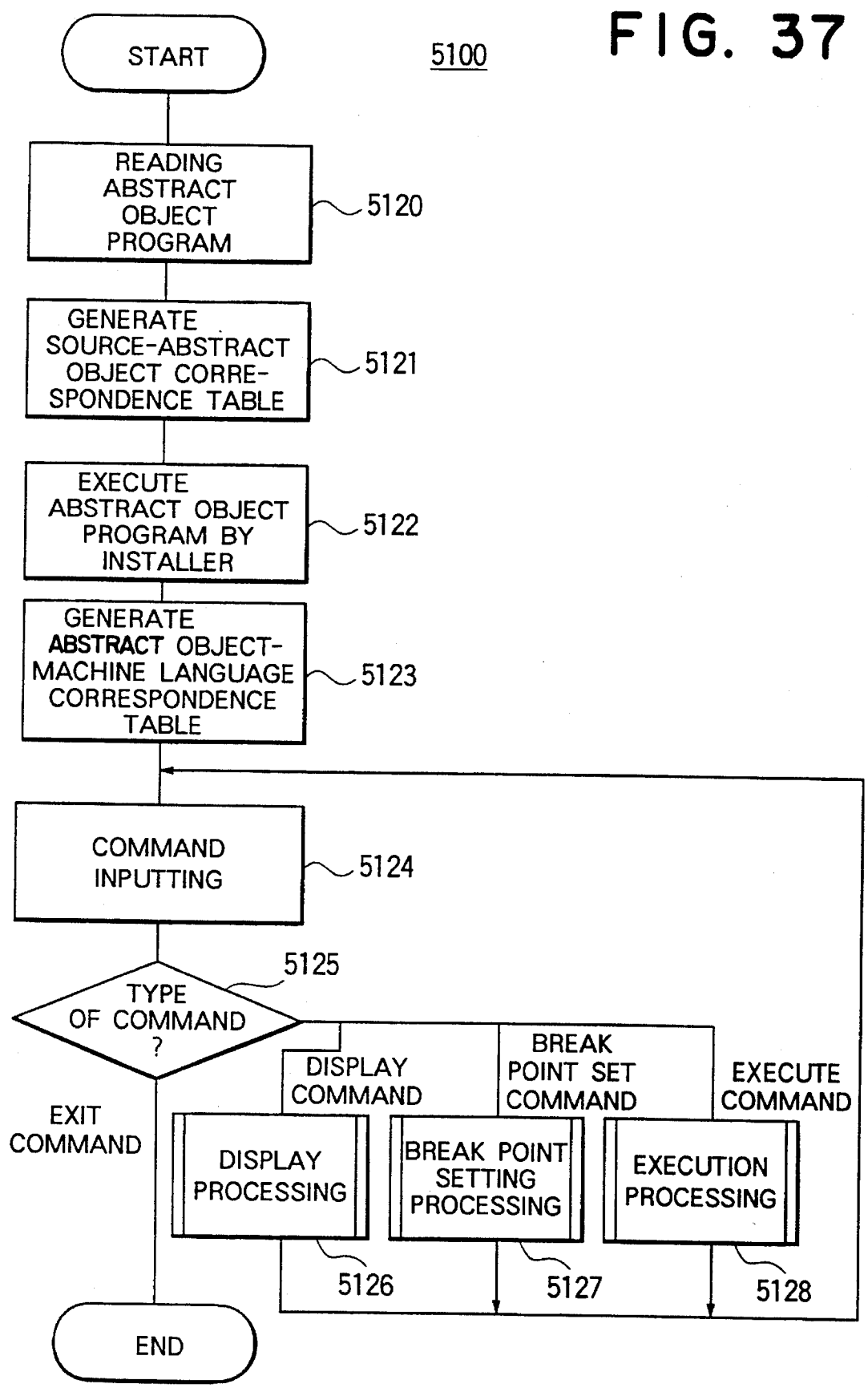
FIG. 37 is a flow chart for illustrating operation of the debugger.

FIG. 37 is a flow chart for illustrating operation of the debugger. At first, an abstract object program 5102 is read (step 5120). Since the abstract object program contains source information indicating positions on the source program and others, a source-abstract object correspondence table is generated on the basis of the source information (step 5121). Subsequently, the installer is operated on the abstract object program as input, to thereby generate a machine language program on the main memory 1step 5122). In that case, an abstract object-machine language correspondence table is generated for establishing correspondence between the abstract object program and the machine language program (step 5123). In this conjunction, it is noted that in the case of the instant embodiment, the source-abstract object correspondence table and the abstract object-machine language correspondence table are integrated into a single table (referred to as a source-abstract object-machine language correspondence table). This table is included in the debug information table 5108. When the user inputs a command requisite for the debugging (step 5124), the processing flow is branched in dependence on the type of the input command (step 5125). More specifically, when a display command is input, displaying processing is executed (step 5126). For a break point setting command as input, a break point setting processing is executed (step 5127), while for an execution command, execution processing is performed (step 5128). Upon completion of these processings, the flow is repeated, starting from the step 5125. The command processings mentioned above will be described in more detail by reference to FIGS. 38 to 43. When the input command is an exit command, the processing is terminated.

Figure 38:
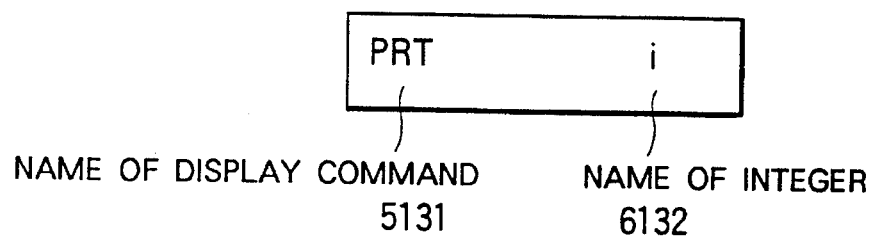
FIG. 38 is a view showing an example of a display command.

FIG. 38 is a view showing an example of the display command. In the case of this example, the display command is for the value of the variable i. The display command, includes a command name PRT 5131 to be displayed and a variable name i 5132.

Figure 39:
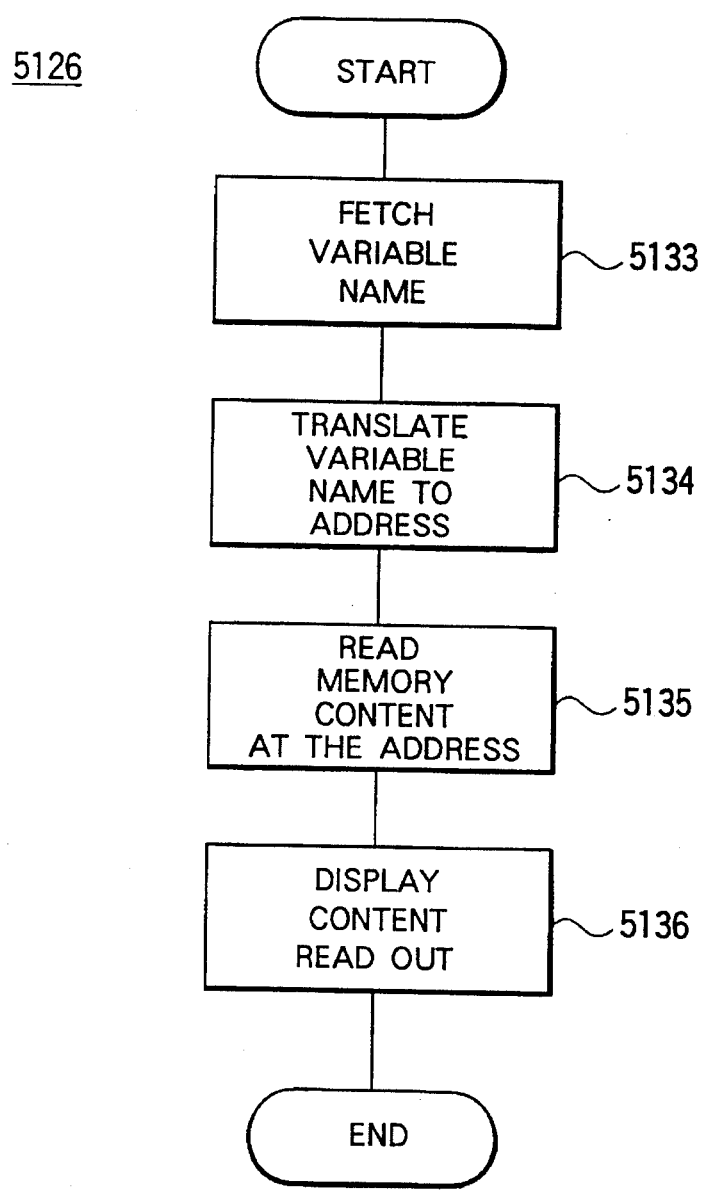
FIG. 39 is a flow chart for illustrating the display processing.

FIG. 39 is a flow chart for illustrating the display processing in detail. In other words, this figure shows details of the processing step 5126 shown in FIG. 37. Referring to FIG. 39, the variable name in the display command is extracted (step 5133). Subsequently, by consulting the source-abstract object-machine language correspondence table (hereinafter Pererred to simply as correspondence table), the variable name is translated into an address on the main memory on which the content of that variable is stored, which is then followed by a step 5135 where the content of the address determined at the step 5134 is read out from the main memory (step 5135). Then the content as read out undergoes translation in accordance with data type of the variable read out to be thereby displayed on the display device.

Figure 40:
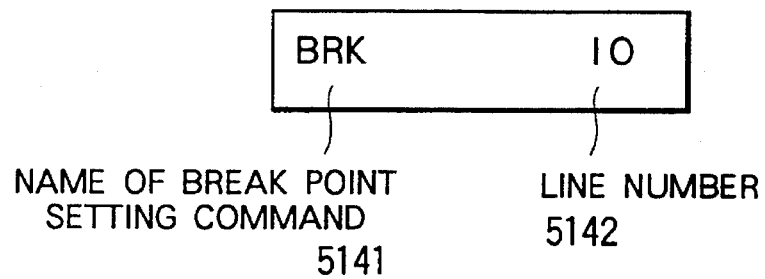
FIG. 40 is a view showing an example of a break-point setting command.

FIG. 40 is a view showing an example of the break-point setting command. More specifically, this exemplary command is For setting a break point in the statement numbered "10" in the source program and composed of a command name (identifier or ID) 5141 and a statement ID number 5142.

Figure 41:
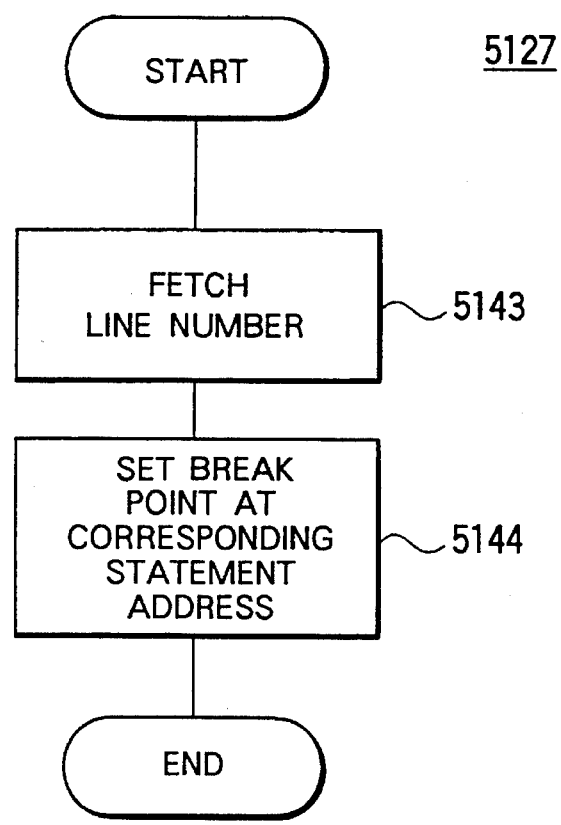
FIG. 41 is a flow chart for illustrating a break-point setting processing.

FIG. 41 is a flow chart for illustrating a break-point setting processing and shows details of the processing in the step 5127 shown in FIGS. 37. Referring to FIG. 41, the statement ID number in the command is extracted (step 5143). Thereafter, a flag is set which indicates that the break point has been set at the corresponding statement ID number in the correspondence table (step 5144).

Figure 42:
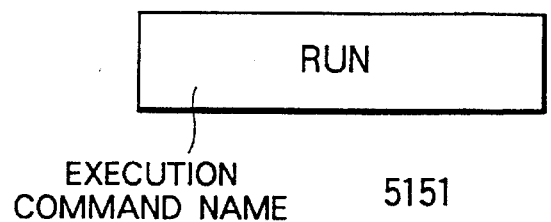
FIG. 42 is a view showing an example of execution command.

FIG. 42 is a view showing an example of execution command, which commands execution of program and consists only of a command name 5151.

Figure 43:
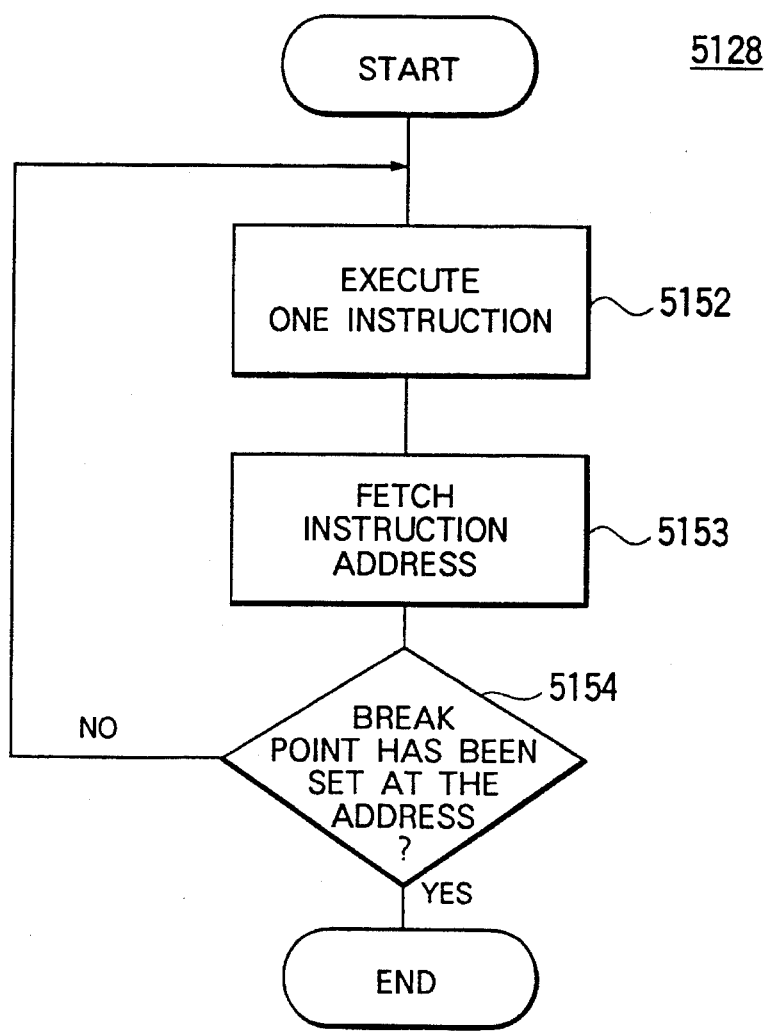
FIG. 43 is a flow chart for illustrating execution processing and shows details of the processing in a step 5128 shown in FIG. 37.

FIGS. 43 is a Flow chart For illustrating execution processing and shows details of the processing in the step 5128 shown in FIG. 37. Referring to FIG. 43, only one instruction is First executed (step 5152). This can be realized by running a CPU in such a mode that trap is validated every time one instruction has been executed, at this time, the control is transferred back to the debugger. Subsequently, address of the instruction is extracted (step 5153), which can be realized, For example, by reading out the content of a program counter. Finally, in a step 5154, it is checked by consulting the correspondence table whether the break point is set at the extracted address. Unless the break point is set, the processing is repeated, starting From the step 5152, while the processing comes to an end when the break point is set.

FIG. 44 is a view showing an example of the source program which is subject to the debugging. In this figure, the statement numbers 5160 and descriptions 5161 of the statements in the source program are shown. It should be mentioned however, that the statement number is not contained in the actual source program. The following description of the instant embodiment will be made on the assumption that the source program shown in FIG. 44 is used.

FIG. 45 is a view showing an example of a source-abstract object-machine language correspondence table. This correspondence table is composed of (a) a statement information table and (b) a variable information table. The statement table includes Four fields which correspond to the source program statement number 5170, the abstract object program instruction address 5171, the machine language program instruction address 5172 and the break-point set flag 5173, respectively. Referring to FIG. 45A, an entry 5174, for example, indicates that the statement numbered "10" is an instruction located at the address of "000060" in the abstract object program, while it is an instruction located at the address of "000040" in the machine language program and that a break point is set in this statement.

The variable information table shown in FIG. 45B includes five fields for a variable name 5175, a variable type 5176, a data type 5177, a line number 5178 and a machine address 5179, respectively. The variable names 5185 represent names of variables in the source program. The variable types 5176 represent discriminatively local variables and global variables. The data type 5177 represents the data types 5177 of the variables. The statement number 5178 represents the position on the source program at which the variable has been declared. The machine language address 5179 is the information of the address of the variable on the machine language program and represents an offset from a frame pointer in the case of the local variable while representing an offset from a base address of the variable area in the case of the global variable. By way of example, an entry 5180 indicates that the variable i is a local variable, the data type is "int" which is located in the statement numbered "4" of the source program and that the offset from the frame pointer on the machine language program is "−4".

As will be understood from the above description, the debug system according to the illustrated embodiment of the invention can enjoy an advantageous effect that one and the same abstract object program can be debugged by plural types of systems because the installer is incorporated for translating the machine-independent abstract object program into an target machine language program.

By utilizing the installer according to the invention, the abstract object program can be supplied in the form of IC card or CD-ROM or the like so as to provide a machine-independent offhand-executable system. For example, by incorporating a game program in an IC card while incorporating the installers in individual machines, respectively, it is possible to execute one and the same game program by different machines (IC card systems). An exemplary embodiment of such system will be described below by reference to FIGS. 46 to 50.

Figure 46:
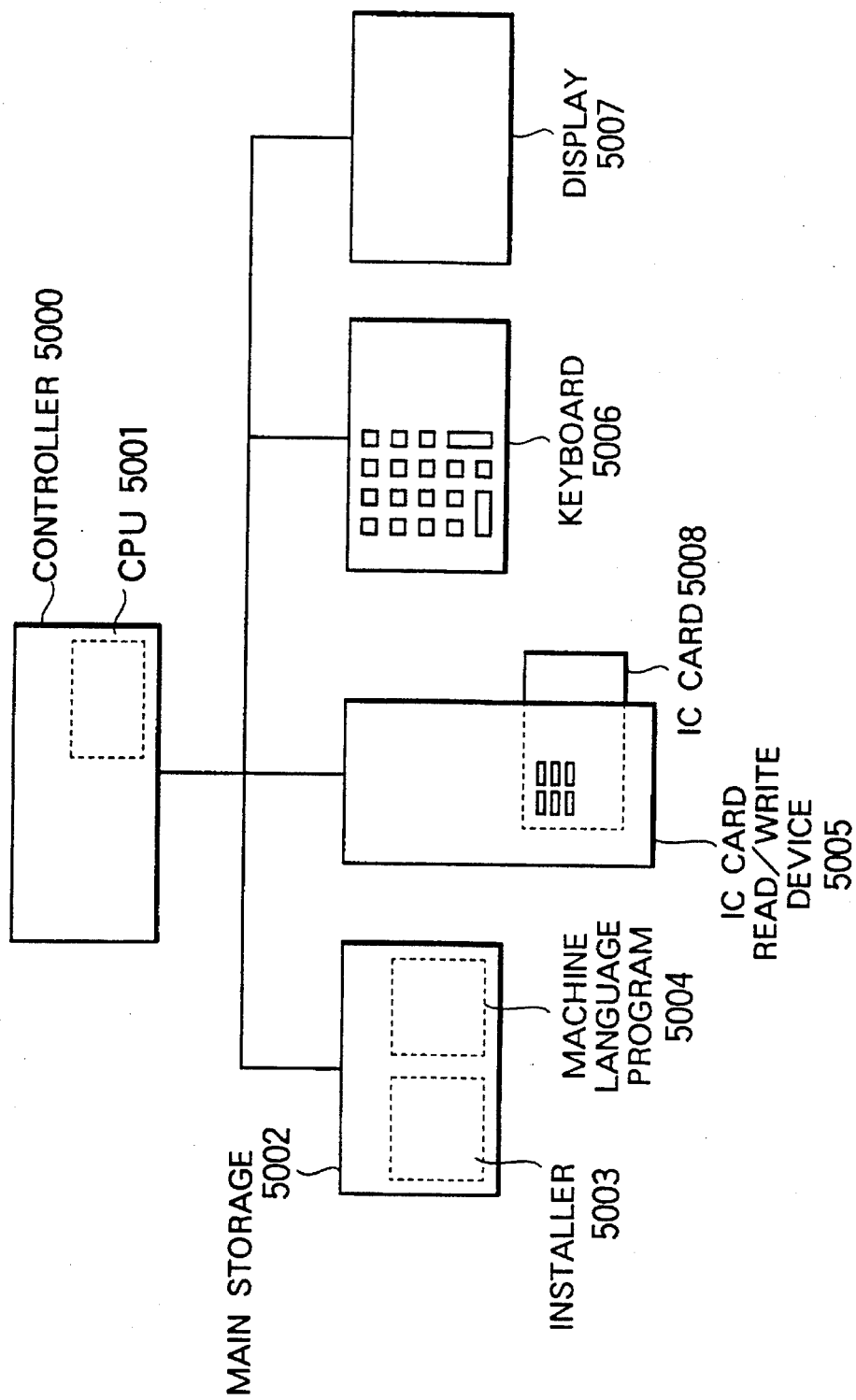
FIG. 46 is a block diagram showing a structure of an IC card device incorporating an installer according to the invention.

FIG. 46 is a block diagram showing a structure of an IC system incorporating an installer according to the invention.

The IC card system shown in this figure includes a controller 5000, a main memory 5002, an IC card read/write device 5005, a keyboard 5006 and a display 5007. The controller 5000 incorporates therein a CPU 5001. On the other hand, the main memory 5002 incorporates an installer 5003. An IC card 5008 is coupled to the IC card system via the IC card read/write device 5005. The program stored in the IC card is loaded into the main storage as a machine language program 5004 through the medium of the installer 5003.

Figure 47:
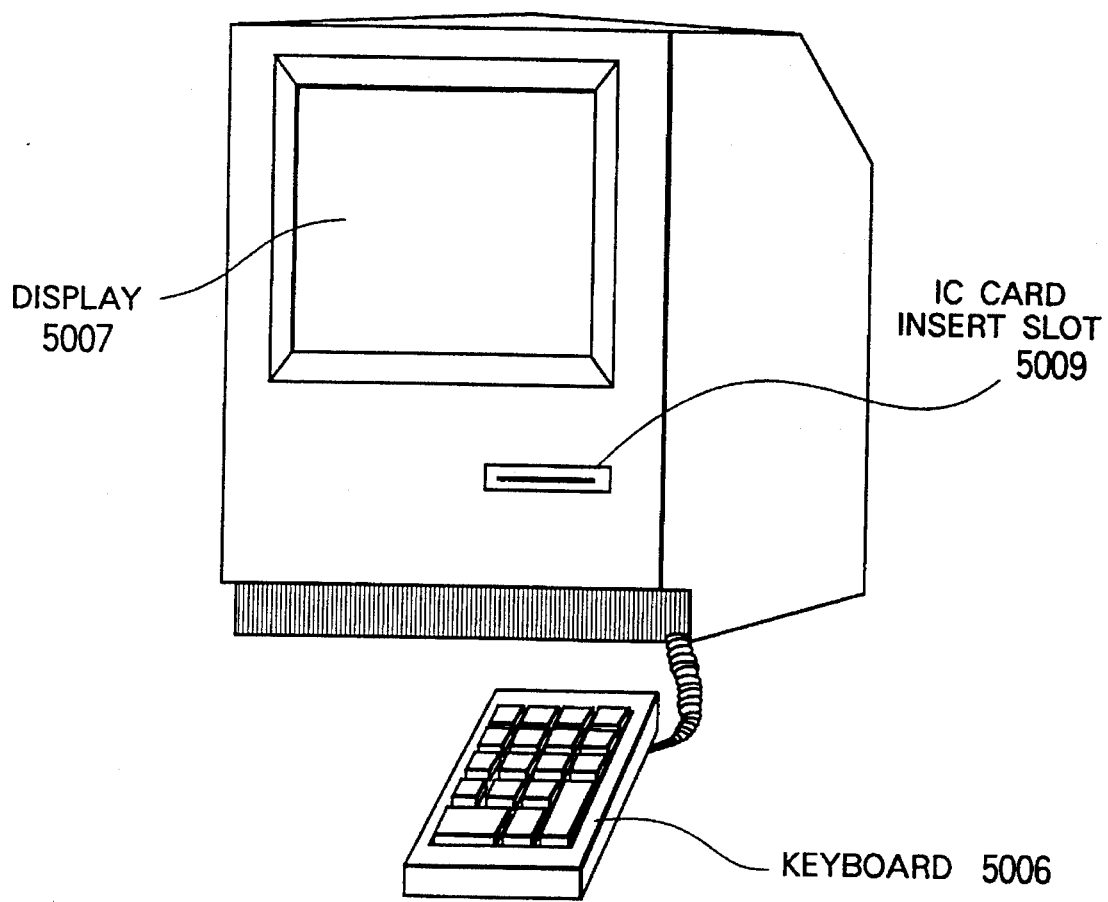
FIG. 47 is a pictorial view showing an outer appearance of an IC card system.

FIG. 47 is a pictorial view showing an outer appearance of the IC card system. A user can input data with the aid of the keyboard 5006, while response to the user is displayed on the display unit 5007. The IC card is inserted through an IC card insertion slot 5009.

Figure 48:
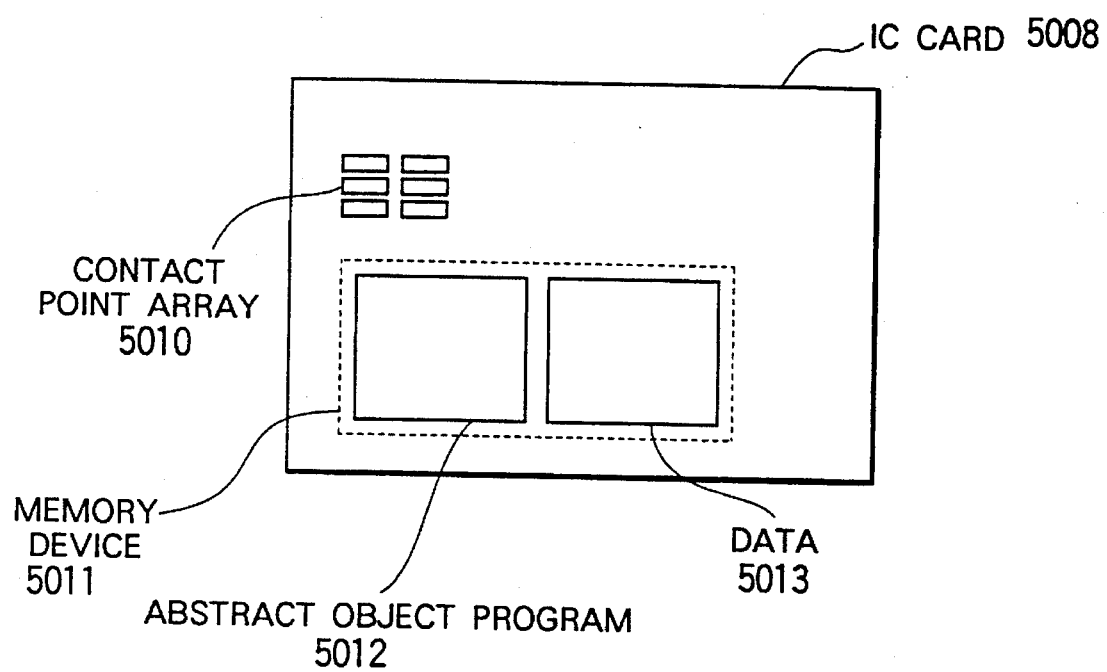
FIG. 48 is a top plan view of an IC card.

FIG. 48 is a top plane view of the IC card 5008. Data transactions between the IC card and the IC card read/write device are realized via contact points 5010. A storage device 5011 stores an abstract object program 5012 to be executed and data 5013.

Figure 49:
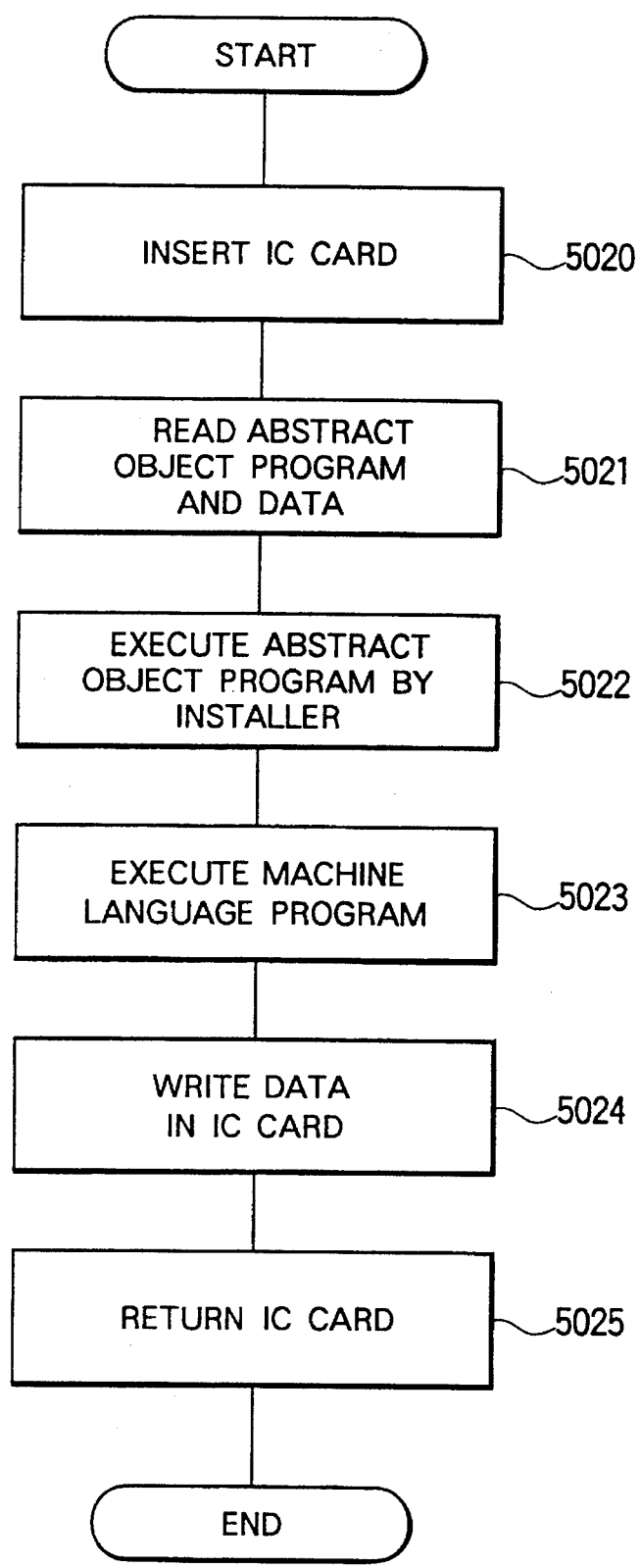
FIG. 49 is a flow chart for illustrating execution of an abstract object program incorporated in the IC card.

FIG. 49 is a flow chart for illustrating execution off the abstract object program incorporated in the IC card. In the first place, the IC card 5008 is inserted into the IC card slot 5009 (step 5020) to read out the abstract object program and the data stored in the IC card (step 5021). In response to the inputting of the abstract object program read out from the IC card, the controller 5000 activates the installer 5003 (step 5022). As a result, there is generated in the main memory the target machine language program 5004, which is then executed (step 5023). As a result of the execution, the resulting data is written in the IC card, if it is required, in a step 5024, and the IC card is returned (step 5025). At this time the transaction comes to an end.

Figure 50:
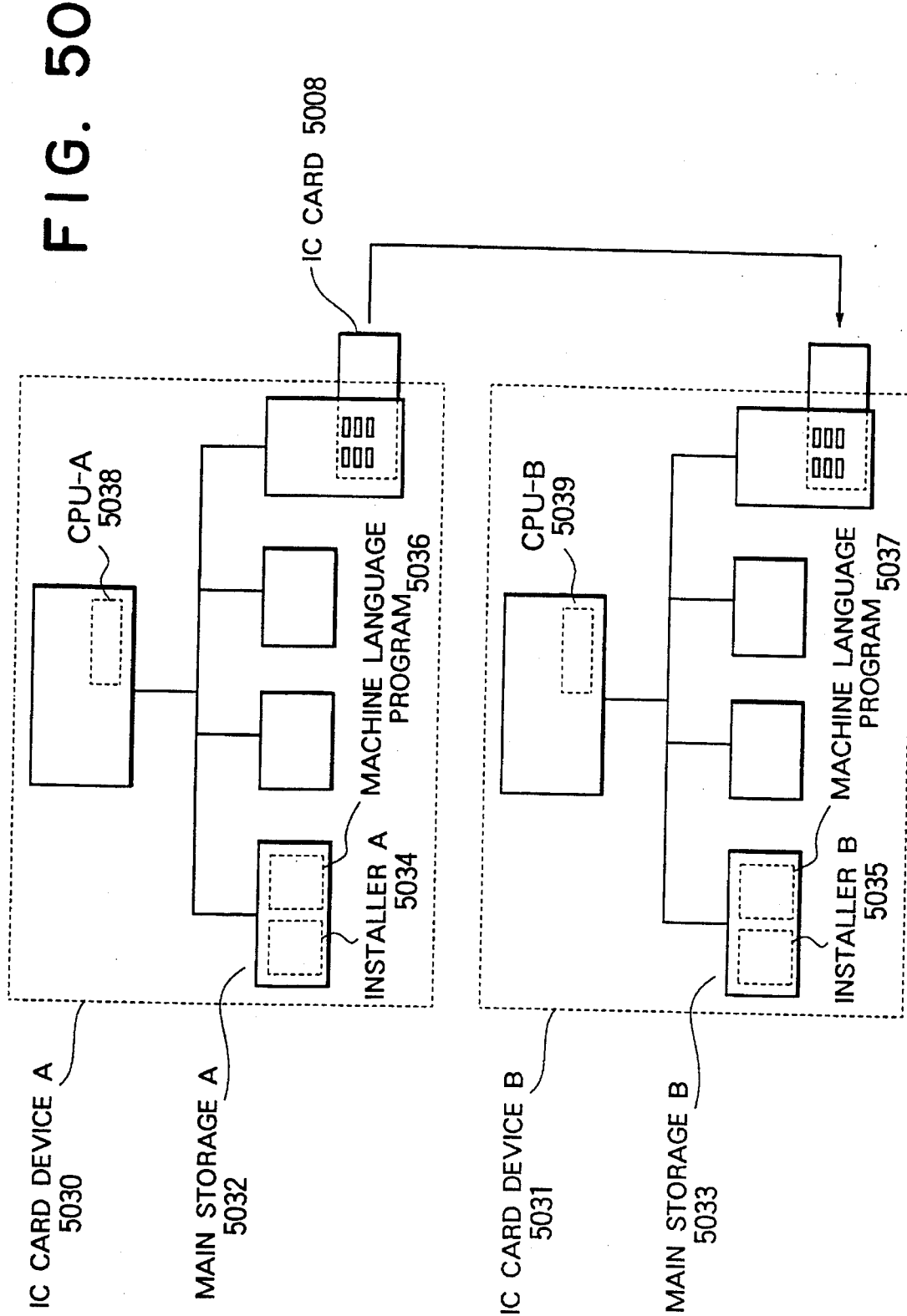
FIG. 50 is a block diagram showing a system in which one and the same abstract object program contained in an IC card is executed by a plurality of IC card systems having different CPUs, respectively.

FIG. 50 is a block diagram showing a system in which one and the same abstract object program contained in an IC card is executed by a plurality of IC card apparatus having different CPUs, respectively, according to an embodiment of the invention. It is assumed, by way of example, that the illustrated system includes IC card apparatuses A and B which incorporate in the respective controllers a CPU-A 5038 and a CPU-B 5039 which have mutually different instruction schemes, respectively. When the abstract object program placed in the IC card 5008 is to be used in the IC card apparatus A, the abstract object program is translated into a machine language program A 5036 described in the CPU-A-oriented machine language. On the other hand, when the abstract object program of the IC card 5008 is to be used in the IC card abstract object program the former is translated into a machine language program B 5037 described in a CPU-B-oriented machine language.

Although it has been assumed in the above description that the IC card is used as the medium for storing and carrying the abstract object program, it should be appreciated that the present invention can equally be applied to the systems in which CD-ROM floppy disk or the like is used.

Figure 51:
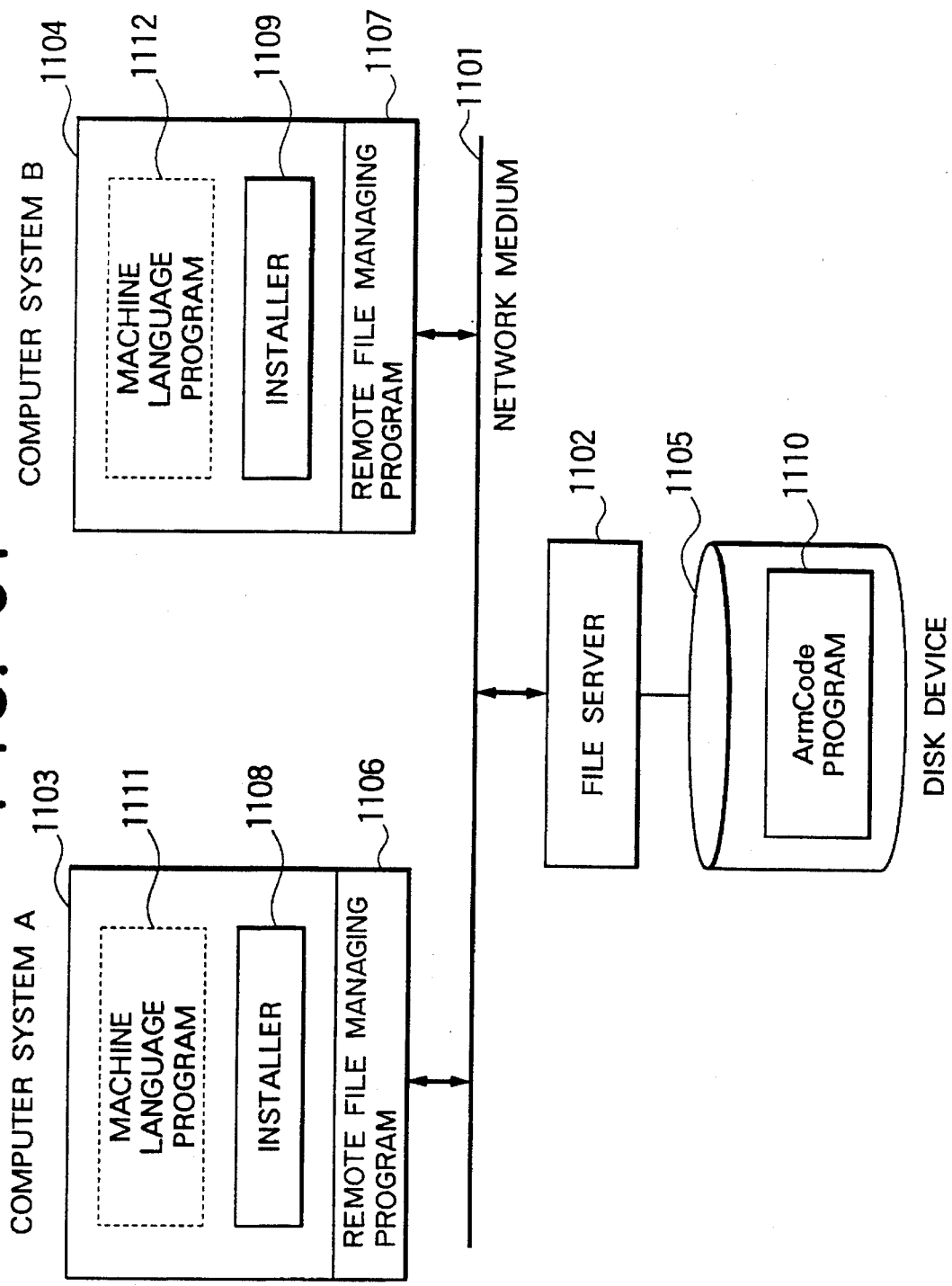
FIG. 51 is a block diagram showing a system in which abstract register machine code programs are shared by computer systems of different machine types which are linked together through a network.

FIG. 51 is a block diagram showing a system in which ArmCode programs are shared by computer systems of different types which are linked together through a network. Connected to a network medium 1101 are a file server 1102 and computer systems which are exemplified by a computer system A 1103 and a computer system B 1104. A disk device 1105 is connected to the file server 1102 which serves for supplying file data from the disk device 1105 to the computer systems A and B (1103 and 1104). Each of the computer systems A and B can make access to the files on the disk device 1105 with the aid of their own remote file management programs (1106, 1107). Further, the computer systems A and B incorporate respective instructions (1108, 1109) for translating the ArmCode program into machine language programs oriented to these computer systems, respectively.

When an ArmCode program 1110 on the disk device 1105 is to be executed by the computer system A, the ArmCode program 1110 made available through the associated remote file management program 1106 is translated into a machine language program 1111 by the installer 1108 to be subsequently executed by the computer system A. Similarly, a machine language program 1112 is generated for execution by the computer system B as well.

In this manner, one and the same ArmCode program can be executed by a plurality of computers of different types connected to the network, which means that commonality of the object program is realized.

In the prior art system, it was impossible to make an object program common to the machines of different types, making it necessary for each machine to hold an object program having a same function. In contrast, by consolidating the object program files required for every types of the machine for a certain function in an ArmCode program file as described above, there can be assured advantages mentioned below.

(1) File capacity of a whole network system can be reduced.

(2) The bug correction and extension of function may be performed only for the ArmCode program without necessitating simultaneous execution for a plurality of object programs, whereby time and labor for version management of the object programs can be reduced drastically.

Figure 52:
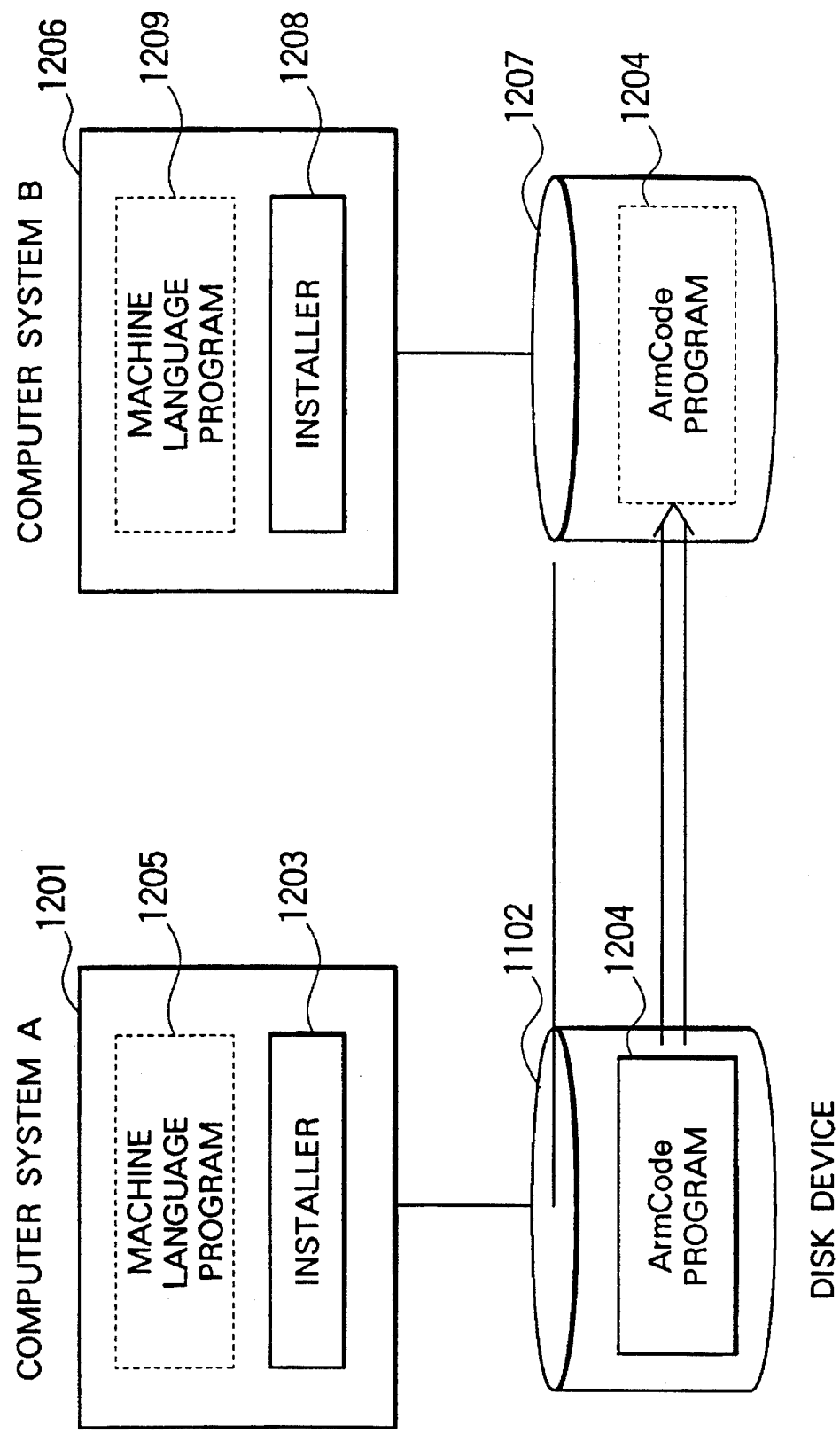
FIG. 52 is a block diagram illustrating, by way of example, replacement of a computer system in which an abstract register machine program is employed by another type of computer system.

FIG. 52 is a block diagram for explaining replacement of a computer system in which an ArmCode program is employed by another type of computer system.

Referring to the figure, it is assumed that in a computer system A 1201, a machine language program running thereon is stored on an associated disk device 1202 in the form of ArmCode program. In other words, when a certain function is to be implemented by the computer system A 1201, the ArmCode program 1204 on the disk system 1202 which corresponds to the function is translated into a machine language program 1205 oriented for the system A 1201 by an installer 1203 for execution.

This type of computer system can easily be replaced by another computer system which incorporates an installer. Namely, replacement of the computer system A 1201 by another system B 1206 can readily be accomplished only by copying the ArmCode program 1204 on the disk device 1202 onto a disk device 1207. Thus, when a certain function implemented by the computer system A 1201 is to be implemented by the computer system B 1206, the ArmCode program corresponding to that function and copied onto the disk device 1207 is translated into a machine language program 1209 by the installer 1208 to be subsequently executed.

By adopting the ArmCode as a scheme for reserving programs on the disk, advantages mentioned below can be obtained.

(1) For the user, the time and labor involved in exchange or switching of the computer systems such as recompiling of source program and regeneration of machine language programs can considerably be reduced.

(2) For the manufactures, a system design for maximizing computer performances can be facilitated because of capability of generating the machine language without need for taking into account the exchangeability or switchability of the computer system.

As will now be appreciated from the foregoing description, it is possible according to the teachings of the present invention to generate a machine language instruction sequence by effectively making use of the real machine registers by virtue of optimization of abstract register usage by the compiler and the real register allocating function of the installer. Moreover, owing to the instruction language pattern replace function of the installer, high-level functional instructions of the real machine can effectively be utilized.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An information processing system, comprising:
    a compiler for translating register-dependent source programs into respective abstract object programs;
    a linker for linking together said abstract object programs to generate an abstract object program in linked form, namely a linked abstract object program; and
    a plurality of installers provided for different types of target computers, for translating said linked abstract object program into machine executable programs corresponding to each type of said target computers respectively.

2. An information processing system according to claim 1, wherein either said abstract object program or said linked abstract object program includes a sequence of instructions for an abstract register machine,
    wherein said abstract register machine includes a plurality of abstract registers and executes transfer instructions between said abstract registers and a memory, computational instructions corresponding to said abstract registers and branch instructions for controlling a sequence of executions of said instructions, and
    wherein said installers are provided in a number corresponding to a number of different types of target computers in which instruction specifications differ from one another, wherein one and the same linked abstract object program resulting from the translation of said source program by said compiler and linked by said linker is translated into said machine executable programs corresponding to said target computers, respectively, by means of said installers provided in association with said target computers, respectively, to thereby allow said machine executable programs to be executed by said target computers, respectively.

3. An information processing system according to claim 2, wherein either of said abstract object program or said linked abstract object program includes, in addition to abstract instructions representing actual operations of said target computers, at least one of said abstract instructions including generation control instructions for controlling generation of a machine instruction sequence of said target computers, program structure description instructions representing a loop and branch structure of said source program, symbol description instructions for establishing correspondence between instructions in said abstract object program and symbol names in said source program, memory description instructions for establishing correspondence between locations or sizes of the memory used by said abstract object program and said symbol names, and debugging instructions indicating debugging information.

4. An information processing system according to claim 3, wherein a portion of said generation control instructions include register allocation control instructions indicating types of said abstract registers, priorities of said abstract registers in the allocation of physical registers of said target computers and requirements for a minimum number of said physical registers to be unallocated.

5. An information processing system according to claim 4, wherein said register allocation priority is determined based on the access frequency and the position of instructions using said abstract register that is indicated by said program structure description instructions within said abstract object program.

6. An information processing system according to claim 4, wherein said installer includes a function for recording priorities of physical registers of said computer in allocating said physical registers to the registers of said abstract register machine even after said registers allocation control instructions have been processed.

7. An information processing system according to claim 3, wherein said installer has a function for optimizing the machine language program in conformance to characteristics of said target computer.

8. An information processing system according to claim 3, wherein said installer generates the machine language program from the abstract object program in accordance with machine language instruction generating rules established for said abstract register machine instruction sequence.

9. An information processing system according to claim 7, wherein said installer includes a function capable of generating, from the abstract object program, different machine language programs conforming to said target computers by changing the machine language instruction generating rules for said abstract register machine instruction sequence in conformance to said target computers.

10. An information processing system, comprising:
    a compiler for translating register-dependent source programs into object programs including executable instructions indicating computational operation; and
    a target computer for executing computational operations in accordance with said executable instructions of said object programs;
    wherein each of said object programs includes, in addition to executable instructions sequence for said target computer, at least one instruction selected from a group comprising generation control instructions including controlling allocation and release of registers, structure description instructions indicating a structure of the source program, symbol description instructions for establishing correspondence between instructions in said object program and symbol names in said source programs, memory description instructions for establishing correspondence between locations and sizes of memory used by the program and symbol names and debugging information instructions for indicating debugging information.

11. A machine executable program generating system, comprising:
    a compiler for translating register-dependent source programs into respective abstract object programs, each of said abstract object programs including a sequence of abstract instructions in an abstract register machine instruction sequence;
    a linker for linking together a plurality of said abstract object programs to thereby generate an abstract object program in linked form, namely a linked abstract program; and
    installers, each of said installers translating a given one of either of said abstract object programs or said linked abstract object program into a machine executable program which is stored in a memory of one type of computer;

wherein each of said installers is provided for each type of computer having instruction schemes differing from other types of computers, to thereby allow a processing operation indicated by a same one of said abstract object programs to be executed by each of said plural types of computers in different instruction set.

12. A machine executable program generating system comprising:

a source program described in a high-level language;

an abstract object program generated by translating said source program, wherein said abstract object program has a plurality of abstract registers and comprises an abstract register machine instruction sequence including a transfer instruction between said register and a memory, a computational instruction executed on said registers and a control instruction for controlling the sequence of instructions; and means for translating said abstract object program into an executable machine language program.

13. A debugging system according to claim 11, wherein the abstract object program is executed by a plurality of different machine types of computers.

14. A debugging system according to claim 11, wherein one and the same debug system is implemented on a plurality of different machine types of computers.

15. An information processing system, comprising:

a portable storage medium;

an information processor for performing data transactions with said portable storage medium loaded in said information processor;

wherein said portable storing medium stores therein an abstract object program which includes a plurality of abstract registers and is composed of an abstract register machine instruction sequence including a transfer instruction between said register and a memory, computational instructions for said registers and an instruction for controlling the sequence of said computational instructions; and means for reading and translating said abstract object program into an executable machine language program.

16. An information processing system according to claim 14, wherein said portable storage medium is constituted by an integrated circuit card.

17. An information processing system according to claim 15, wherein said portable storage medium is constituted by a CD-ROM, or compact disk-read only memory.

18. A method of generating from at least one source program a machine language program suitable for a type of computer, the method being executed by a computer system and comprising the steps of:

compiling said at least one register-dependent source program to generate an abstract register object program for an abstract register machine; and translating said abstract object program into a machine language program in accordance with a type of computer, the machine language program being executed by the computer.

19. An information processing system according to claim 3, wherein a portion of said generation control instructions includes instructions for controlling generation of machine instructions for said target computers in conformance with a register allocation state which holds mapping from said abstract registers to physical registers of said target computers.

20. An information processing system according to claim 19, wherein said portion of said generation control instructions indicates either of allocation or non-allocation of a physical register for said abstract register.

21. An information processing system according to claim 3, wherein said installer includes a function for generating the machine executable program in which machine instruction sequences for said target computer generated from a same abstract instruction sequence are different according to either of a preceding or succeeding abstract instruction sequence.

22. An information processing system according to claim 3, wherein said installer includes a function for generating the machine executable program in which machine instruction sequences for said target computer generated from a same abstract instruction sequence are different according to a register allocation status which holds mapping from said abstract registers to physical registers of said target computers.

* * * * *